(12) United States Patent
Asandei

(10) Patent No.: US 9,512,250 B2
(45) Date of Patent: Dec. 6, 2016

(54) MANGANESE CATALYZED PHOTOPOLYMERIZATION OF FLUORINATED MONOMERS

(71) Applicant: UNIVERSITY OF CONNECTICUT, Farmington, CT (US)

(72) Inventor: Alexandru D. Asandei, Vernon, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 342 days.

(21) Appl. No.: 13/773,719

(22) Filed: Feb. 22, 2013

(65) Prior Publication Data

US 2013/0225712 A1    Aug. 29, 2013

Related U.S. Application Data

(60) Provisional application No. 61/602,409, filed on Feb. 23, 2012, provisional application No. 61/602,417, filed on Feb. 23, 2012.

(51) Int. Cl.
| | |
|---|---|
| *C08F 2/46* | (2006.01) |
| *C08F 2/50* | (2006.01) |
| *C08G 61/04* | (2006.01) |
| *C08F 14/22* | (2006.01) |
| *C08F 14/18* | (2006.01) |
| *C08F 2/06* | (2006.01) |

(52) U.S. Cl.
CPC ............... *C08F 14/22* (2013.01); *C08F 14/18* (2013.01); *C08F 2/06* (2013.01)

(58) Field of Classification Search
CPC .................................. C08F 14/22; C08F 14/18
USPC ................. 522/67, 6, 1, 71, 189, 184; 520/1
See application file for complete search history.

(56) References Cited

U.S. PATENT DOCUMENTS

| 5,453,467 A * | 9/1995 | Bamford ............. A61L 33/0088 427/2.24 |
| 7,649,027 B2 * | 1/2010 | Imai ................................ 522/81 |
| 2006/0147840 A1 * | 7/2006 | Ishidai .......................... 430/300 |
| 2013/0225775 A1 * | 8/2013 | Asandei ....................... 526/190 |

OTHER PUBLICATIONS

Asandei; "Photomediated Controlled Radical Polymerization and Block Copolymerization of Vinylidene Fluoride"; Chem. Rev.; 116(4); 2016; 31 pages.

* cited by examiner

*Primary Examiner* — Ling Choi
*Assistant Examiner* — Jessica E Whiteley
(74) *Attorney, Agent, or Firm* — Cantor Colburn LLP

(57) ABSTRACT

The disclosure discloses initiating systems for the radical polymerization of alkenes, and especially fluorine substituted alkenes. The polymerization is catalyzed by a metal carbonyl, preferably manganese carbonyl. The polymerization is initiated directly from alkyl halides at room temperature under visible white light. The polymers also allow the synthesis of block copolymers. The process comprises polymerizing at least one alkene monomer in the presence of a halide radical initiator, carbonyl catalyst and a solvent, under reaction conditions and for a time sufficient to polymerize the at least one alkene monomer to form a polymer. The present disclosure provides a method for living polymerization of alkene monomers which provides a high level of macromolecular control over the polymerization process and which leads to uniform and controllable polymeric products. This disclosure also provides a method for activating any halide (Cl, Br, I) chain ends of such polymers for the synthesis of block copolymerizations.

15 Claims, 8 Drawing Sheets

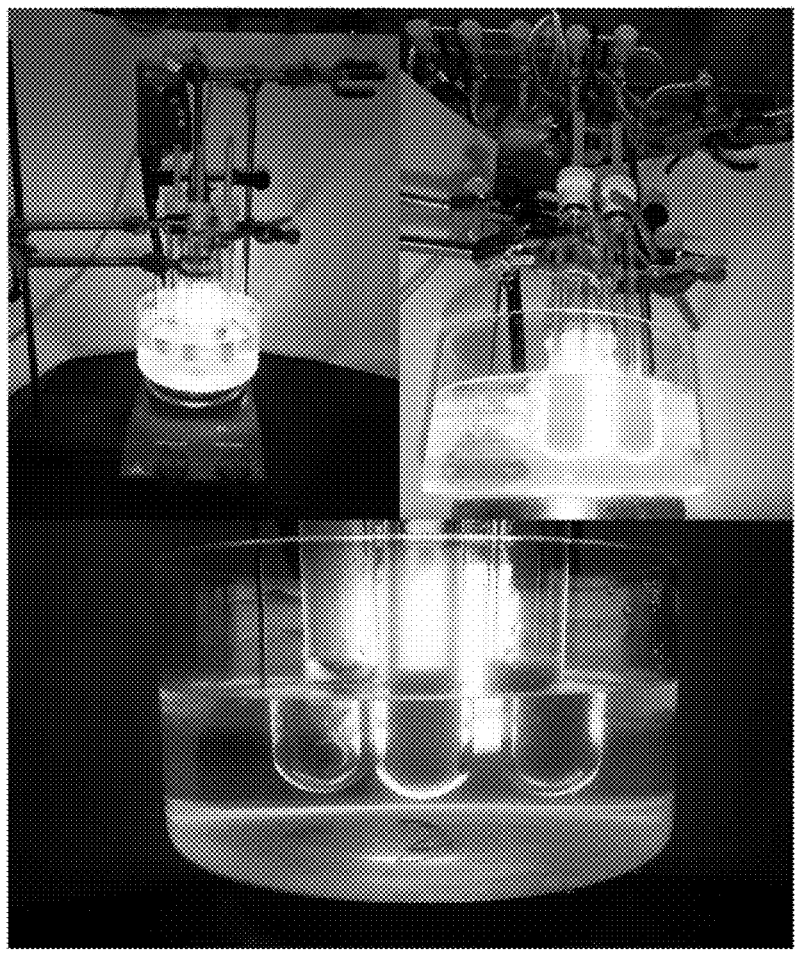
Figure 1. $Mn_2(CO)_{10}$ mediated VDF photo polymerization typical setup (top), and the polymerization at several stages of conversion (bottom).

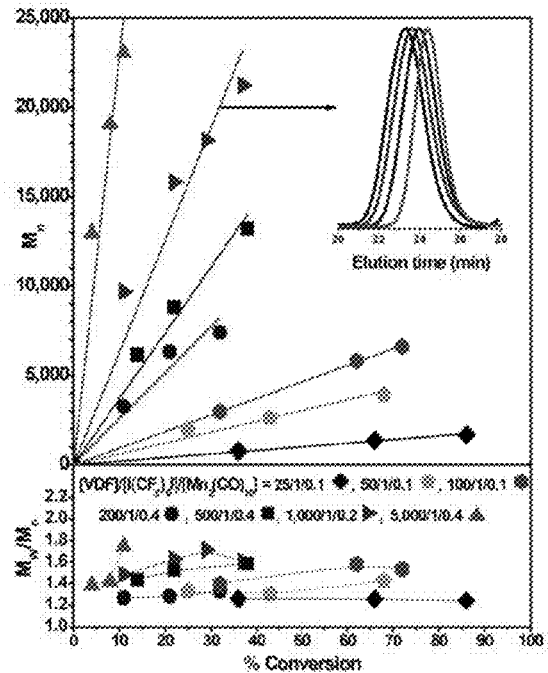
Figure 2. Dependence of $M_n$ and $M_w/M_n$ on conversion in the VDF-CRP: RT, visible light. Inset: GPC of (▶).
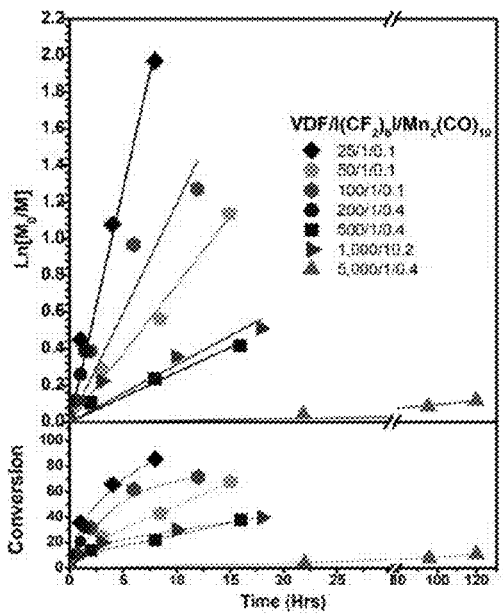
Figure 3. Kinetics of the $Mn_2(CO)_{10}$ photomediated VDF polymerizations at various VDF/I ratios corresponding to Ex. 43-49 in Table S1.

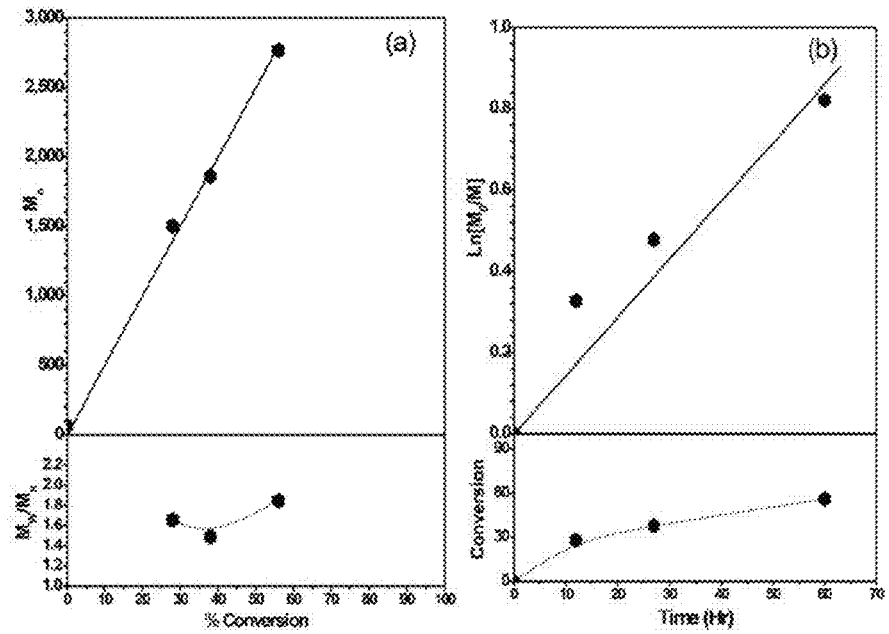
Figure 4 (a) and (b). $Mn_2(CO)_{10}$ photomediated synthesis of poly(VDF-co-HFP). (a) Dependence of $M_n$ and $M_w/M_n$ on conversion; (b) First order kinetics. [VDF]/[HFP]/[$CF_3$-$CF_2$-$CF_2$-I]/[$Mn_2(CO)_{10}$] = 80/20/1/0.2, T = 40°C.
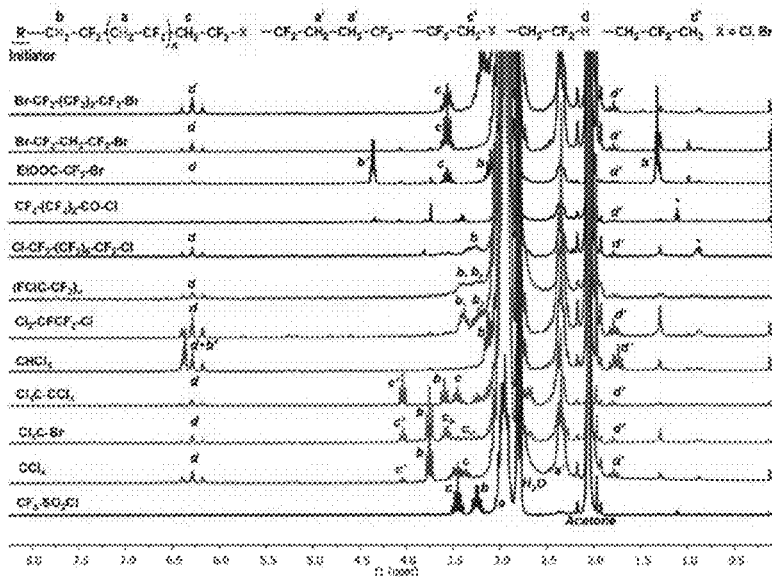
Figure 5a. 500 MHz acetone $d_6$ $^1$H-NMR spectra of PVDF initiated from Cl and Br substrates. * Impurities associated with solvent or initiator.

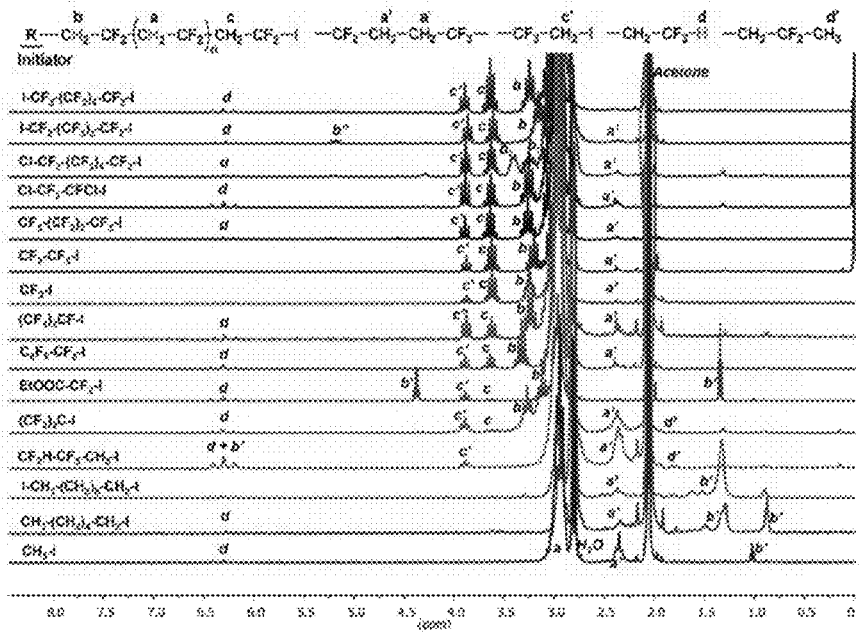
Figure 5b. 500 MHz acetone $d_6$ $^1$H-NMR spectra of PVDF initiated from iodine substrates.
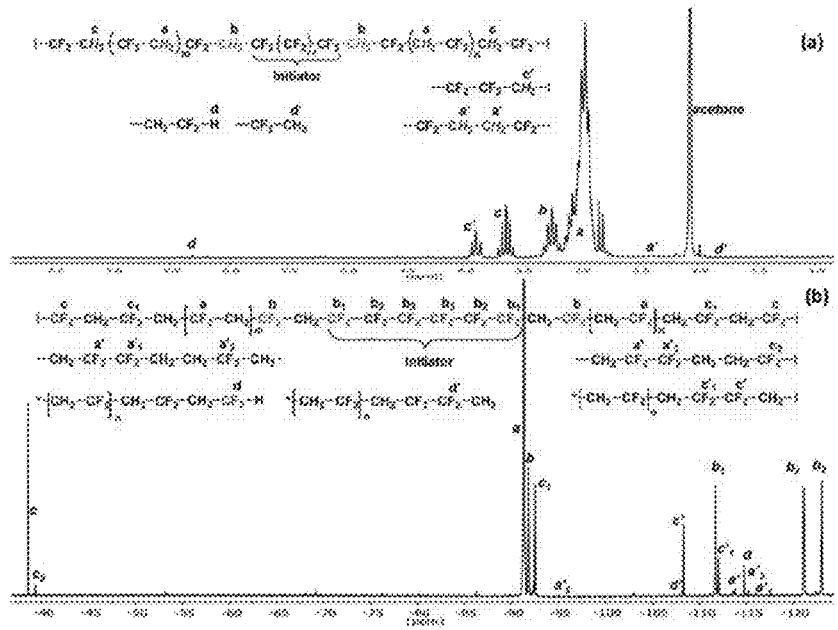
Figure 5c. Comparison of the $^1$H and $^{19}$F-NMR spectra of I-PVDF-I initiated from I-$(CF_2)_6$-I. VDF/I-$(CF_2)_6$-I/$Mn_2(CO)_{10}$=50/1/0.1.

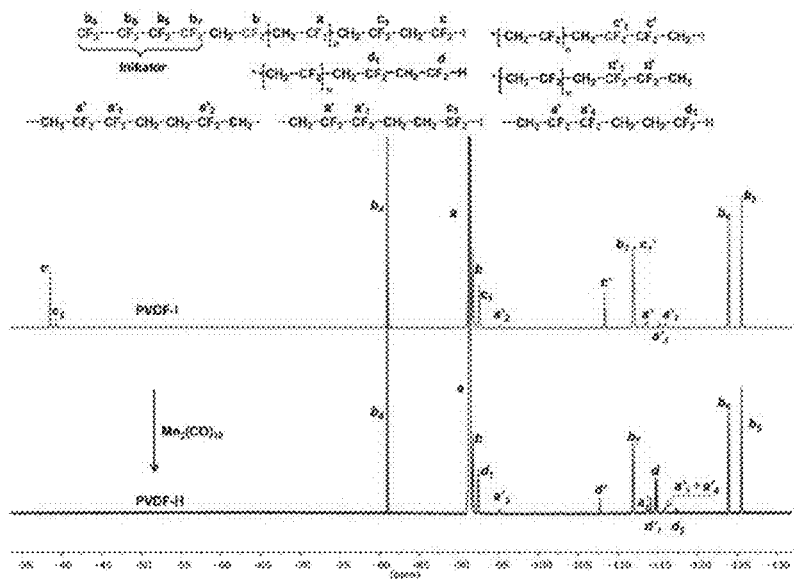
Figure 5d. Comparison of the $^{19}$F-NMR spectra of PVDF-I initiated from $CF_3\text{-}(CF_2)_3\text{-}I$ with the corresponding PVDF-H sample obtained after complete iodide abstraction by $Mn_2(CO)_{10}$.
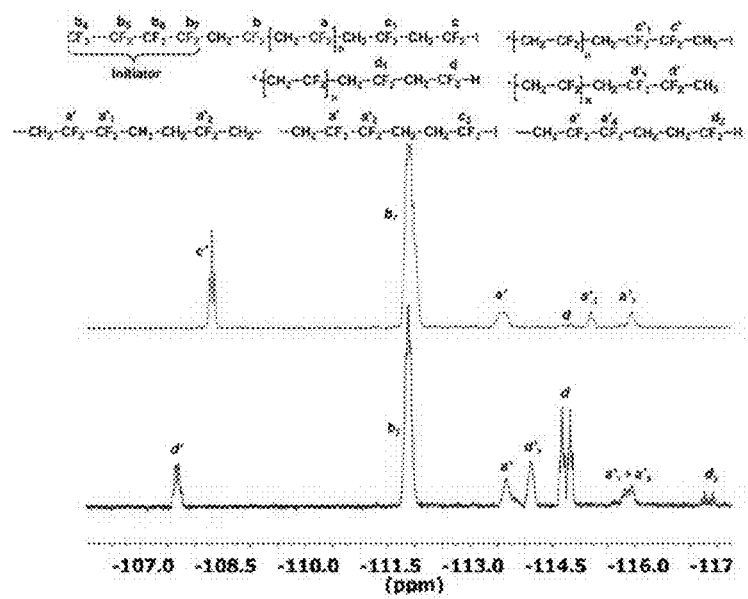
Figure 5e. Expansion of the -107 ppm to -117 ppm region from Figure 5d.

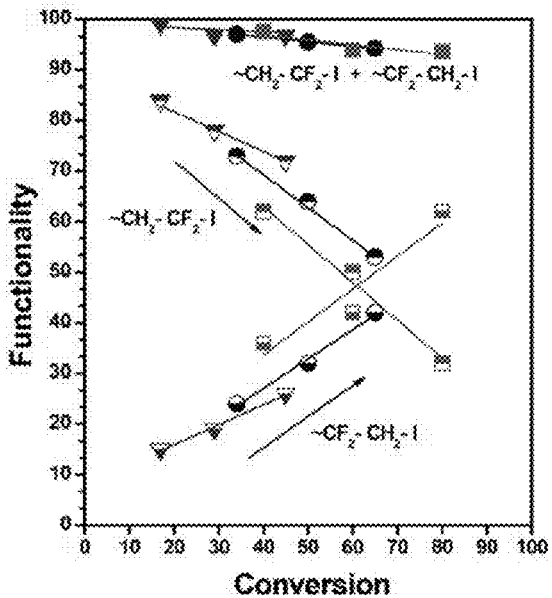
Figure 6. Dependence of halide chain end functionality on conversion in the $Mn_2(CO)_{10}$ mediated CRP of VDF, rt, visible light. [VDF]/[I(CF$_2$)$_6$I]/[$Mn_2(CO)_{10}$] = 50/1/0.1 (▼), 50/1/0.2 (●), 50/1/0.4 (■). Filled symbols = total functionality, top filled = ~CH$_2$-CF$_2$-I, bottom filled = ~CF$_2$-CH$_2$-I.
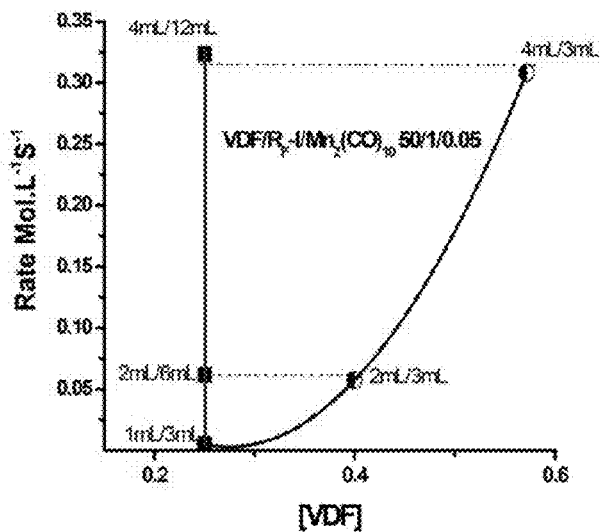
Figure 7. Effects of VDF amount on reaction Rates

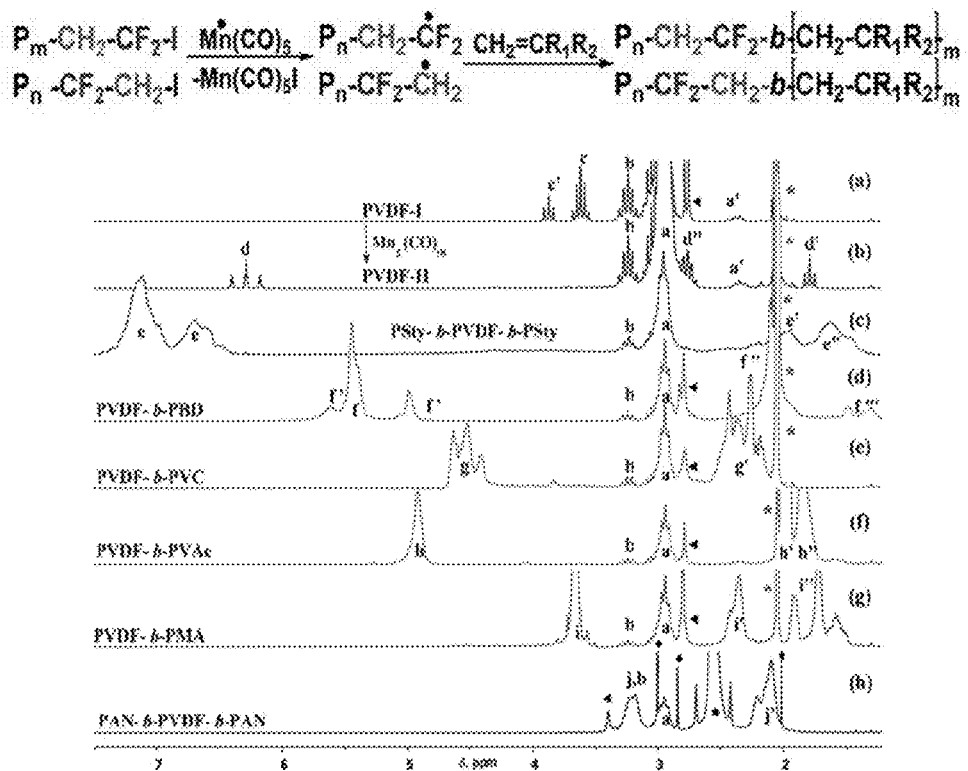
Figure 10. 500 MHz 1H-NMR spectra of PVDF-I, PVDF-H and various PVDF block copolymers. All in $d_6$-acetone except PAN in $d_6$-DMSO. ◄ = $H_2O$, * = acetone, ♦ = DMAC, ● = DMSO.

MANGANESE CATALYZED PHOTOPOLYMERIZATION OF FLUORINATED MONOMERS

CROSS REFERENCED APPLICATIONS

This application claims priority to U.S. Provisional Application Nos. 61/602,409 and 61/602,417, both filed on Feb. 23, 2012, both of which are incorporated herein in their entirety by reference thereto.

BACKGROUND

1. Field of Disclosure

This disclosure describes novel initiating systems for the free radical and controlled radical polymerization of alkenes, and especially fluorine substituted alkenes. The polymerization is initiated directly from alkyl halides at any temperature, including room temperature under light conditions such as UV, laser or visible white light (e.g., regular fluorescent bulb). The polymers also contain halide chain ends which allow the synthesis of block copolymers.

2. Discussion of the Background Art

Fluorinated (co)polymers are fundamental specialty materials endowed with wide morphological versatility, high thermal/chemical/ageing/weather resistance, low surface energy, dielectric constant, flammability, refractive index, and moisture absorption. Applications for fluorinated (co)polymers include paints, coatings, pipe liners, transmission fluids, O-rings, fuel cell membranes, antifouling layers, optical fibers and high power capacitors. The properties, and thus the applications, of fluorinated (co)polymers are related to their molecular weights, polydispersity and the like, making their precise synthesis very relevant. However, while controlled radical polymerizations (CRPs) have recently seen remarkable developments, and atom transfer radical polymerization (ATRP), nitroxide or reversible addition fragmentation (RAFT) methods have proven very successful for acrylates or styrenes, the applicability of these methods for very reactive main chain fluorinated alkenes (such as vinylidene fluoride (VDF), hexafluoropropene (HFP), tetrafluoroethylene (TFE), and the like, still awaits demonstration.

Consequently, because (co)polymers of main chain fluorinated monomers (e.g., vinylidene fluoride (VDF), hexafluoropropene (HFP), tetrafluoroethylene (TFE), trifluorochloroethylene (TFCE), etc., are industrially significant, the study of their CRP, and the synthesis of complex polymer architectures thereby derived, is an important area of inquiry. Conversely, such polymerizations are challenging on laboratory scale, as VDF boils at −83° C. Typical telomerizations/polymerizations of fluorinated monomers such as VDF are carried out at a temperature of >80-100° C. and require high-pressure metal reactors.

Accordingly, by contrast to styrene/acrylate CRPs which are conveniently sampled on a 1 g scale, kinetic studies of VDF polymerizations involve many one-data-point experiments. This is very time-consuming and expensive due to the typical unavailability (in a research lab) of a large number of costly metal reactors which, moreover, require tens of grams of monomer. Thus, the development of methods that would allow small scale (e.g., 1 g) polymerizations at room temperature (RT) in inexpensive high-pressure glass tubes would be highly desirable. Those methods could be adapted for fast screening of a wide range of catalysts and reaction conditions, and moreover, also take advantage of photochemistry.

However, while VDF telomers (degree of polymerization (DP)=1-3) may be obtained at high temperatures (>100° C.) from transition metal salts and polyhalides using redox catalysis, there are no reports on metal-mediated VDF polymerizations. VDF polymerization at room temperature was shown to proceed with alkyl boron/$O_2$ in a poorly controlled, free radical manner where block copolymer synthesis was not possible.

The most successful approach to date to the CRP of VDF and the like is the uncatalyzed iodine degenerative transfer (IDT: $P_n^{\bullet}+P_m-I \leftrightarrows P_n-I+P_m^{\bullet}$), one of the oldest CRP methods, and the first implemented industrially, which emerged from research on free radical VDF telomerizations with polyhalides, especially perfluorinated mono and/or diiodo chain transfer (CT) agents (e.g., $CF_3$—I, $CF_3$—$(CF_2)_3$—I, $CF_3$—$(CF_2)_5$—I, $(CF_3)_2CF$—I, I—$(CF_2)_{4-6}$—I, $HCF_2CF_2CH_2$—I, $C_6F_{13}CH_2CF_2$—I, and even $R_F$—$CH_2$—$CH_2$—I), the synthesis of which, as well as derivatization of PVDF—I chain ends, is understood. Modeling and kinetic investigations also revealed the contributions of the structure of the CT agent, of side reactions and of monomer addition mode (1, 2- vs. 2, 1-), to the degree of living polymerization.

In all current IDT-VDF-CRPs, an external radical source (e.g., t-butyl peroxide) is always required, as direct initiation from perfluoro halides or alkyl halides is not available. However, direct initiation from e.g. a halide is very important in the precise synthesis of block or graft copolymers based on fluorinated monomers where such a system would otherwise inevitably form a mixture of homopolymers and copolymers. Therefore, availability of direct halide initiation would be highly valuable.

However, while 1:1 additions of perfluoroalkyl radicals to nonfluorinated alkenes with Cu, Zn, Pd, $SnCl_2/CH_3COOAg$, $Cp_2TiCl$, $PPh_3$, AIBN, or $(NH_4)_2S_2O_8/HCOONa$ occurs easily, metal catalyzed addition of such electrophilic perfluororadicals to electrophilic fluorinated alkenes (FMs) at temperatures <100° C. and especially at RT is conspicuously absent from the literature. Consequently, the ability to carry out such reactions under mild conditions would be of great synthetic use, in view of the great demand for trifluoromethylations and in the initiation of the CRP of FMs.

VDF telomerizations under high power UV are available; however, there are no reports on VDF polymerizations under regular visible light. Moreover, the concept of initiating radical polymerizations using $Mn_2(CO)_{10}$ and regular alkyl halides does exist in the literature. However, this concept was not applied to perfluoroalkyl halides (which have a completely different reactivity) and, moreover, there was no indication in these applications that such halides would add to main chain fluorinated monomers such as VDF.

Thus, a need exists for methods which allow small-scale polymerizations of fluorinated alkenes for, e.g., catalyst screening experimentation. A need also exists for methods which allow polymerizations of fluorinated alkenes at RT and ambient or slightly elevated pressures. A need further exists for methods which allow polymerizations of fluorinated alkenes under regular visible light. Finally, a need exists for methods which allow polymerizations of fluorinated alkenes from direct halide initiation.

SUMMARY

These and other needs are met by the present disclosure which, in one embodiment, provides methods of making FM polymers at or about room temperature (RT) and at low to moderate pressure. The methods may be carried out under regular visible light, including under standard fluorescent light. The method comprises adding a metal carbonyl into a solvent, adding a halide initiator to the mixture of metal carbonyl and solvent, adding a fluorinated monomer to the combination of metal carbonyl and initiator and allowing the polymerization to proceed for the desired time. In another embodiment, random copolymers can be made by the addition of a co-monomer to the metal carbonyl, solvent and halide initiator in addition to the first fluorinated monomer. In a still further embodiment, block copolymers of a fluorinated polymer and a co-monomer may be made. In this embodiment, the fluorinated polymer is first produced having one or more halide terminal end(s) and, subsequently, a second monomer is added and polymerized from one or both ends of the fluorinated polymer. The second monomer used when making either the random or block copolymers can be a fluorinated co-monomer or another monomer. Likewise, when the polymer chain has a reactive site along the length of the backbone, graft copolymers may be obtained. In these situations, the second monomer used can also be a fluorinated co-monomer or another monomer. The present disclosure lends itself to producing polymers with various specifically desired structures and architectures. In terms of topology, such structures and architectures may include linear, star, comb, hyperbranched, dendritic, cyclic, network, and the like. In terms of sequence/composition distribution such structures and architectures may include homopolymer, random copolymer, block copolymer, graft copolymer, gradient copolymer, tapered copolymer, periodic copolymer, alternating copolymer, and the like.

In another embodiment, the present disclosure provides a method of making fluorinated polymers in a living/controlled radical polymerization technique which provides fluorinated polymers having controlled molecular weights and narrow polydispersity indices.

In yet a further embodiment, the present disclosure provides a new composition of matter comprising a halide chain end functionalized fluorinated polymer which is functionalized on both the $\sim CF_2-CH_2$ and $\sim CH_2-CF_2$ polymer termini, resulting in $\sim CF_2-CH_2-X$ and $\sim CH_2-CF_2-X$ where X is a halide and can be further activated, resulting in the ability to be polymerized from both $\sim CH_2-CF_2-X$ and $\sim CF_2-CH_2-X$ ends at the same time. This allows, for the first time, controlled block copolymerization of fluorinated polymers, with either another fluorinated monomer or a second polymerizable monomer. Moreover, the functionalized fluorinated polymers may be reacted with a non-polymerizable alkene, such as allyl alcohol, to alter the functionalization at the termini of the fluorinated polymer so as to allow for the use of the fluorinated polymer in any application desired where the altered functionality would be applicable.

BRIEF DESCRIPTION OF THE DRAWINGS

FIG. 1 is a photograph showing the $Mn_2(CO)_{10}$ mediated VDF photo polymerization typical setup (top), and the polymerization at several stages of conversion (bottom).

FIG. 2 shows the dependence of $M_n$ and $M_w/M_n$ on conversion in the VDF-CRP: RT, visible light.

FIG. 3 shows the kinetics of the $Mn_2(CO)_{10}$ photomediated VDF polymerizations at various VDF/I ratios.

FIG. 4a shows the dependence of $M_n$ and $M_w/M_n$ on conversion and FIG. 4b shows the first order kinetics of the polymerization reaction system of [VDF]/[HFP]/[CF$_3$—CF$_2$—CF$_2$—I]/[Mn$_2$(CO)$_{10}$]80/20/1/0.2, at T40° C.

FIGS. 5a-e are 500 MHz $^1$H-NMR and 400 MHz $^{19}$F-spectra of PVDF—I, PVDF—H and various PVDF block copolymers.

FIG. 6 shows the dependence of halide chain end functionality on conversion in the $Mn_2(CO)_{10}$ mediated CRP of VDF, RT, visible light.

FIG. 7 shows the effects of VDF and solvent amount on polymerization reaction rates.

FIG. 10 is the 500 MHz$^1$-H-NMR spectra of PVDF—I, PVDF—H and various PVDF block copolymers.

DETAILED DESCRIPTION OF THE DISCLOSURE

Figure 8:
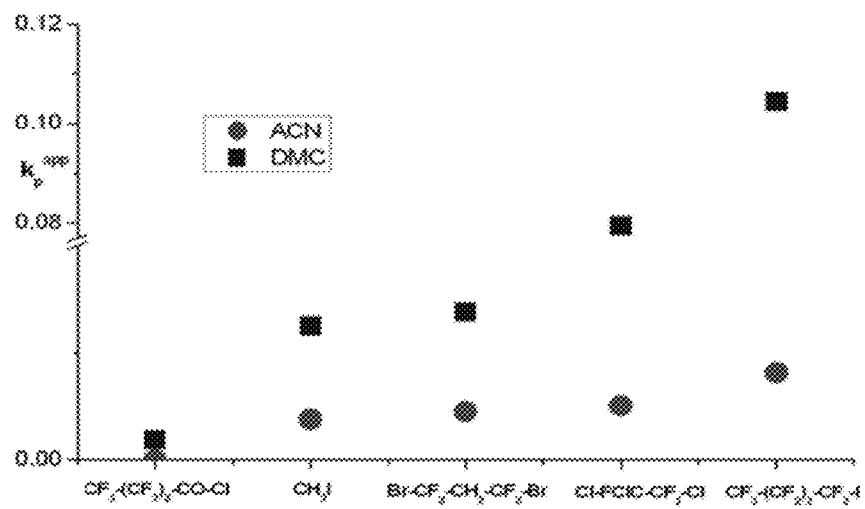
FIG. 8 is a graph comparing the relative rates of polymerizations using DMC and ACN.
Figure 9:
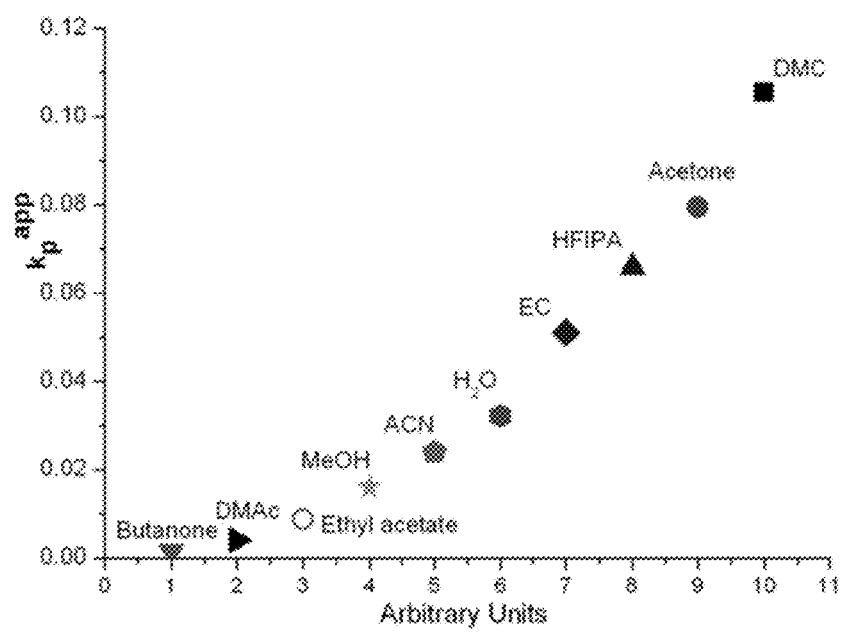
FIG. 9 is a graph comparing the relative rates of polymerizations using various solvents.

The fluorinated monomer which may be used in the presently disclosed process may be any main chain or side chain fluorinated alkene. Preferably, the fluorinated alkene is vinylidene fluoride (VDF), hexafluoropropene (HFP), tetrafluoroethylene (TFE), trifluorochloroethylene (TFCE), and the like. More preferably, the fluorinated alkene is vinylidene fluoride (VDF). For the copolymers, one or more main chain fluorinated alkene may be employed, or any polymerizable co-monomer may be used as well having a polymerizable double bond.

Illustrative alkene monomers include, for example, ethylene, propylene, 1-butene, 3-methyl-1-butene, 1-pentene, 2-methyl-1-pentene, 4-methyl-1-pentene, 1-hexene, 1-heptene, 1-octene, 2-methyl-1-octene, 2-ethyl-1-hexene, 5-methyl-1-heptene, 1-nonene, 1-decene, 1-undecene, 1-dodecene, 2-methyl-1-dodecene, 1-tetradecene, 2-methyl-1-tetradecene, 1-hexadecene, 2-methyl-1-hexadecene, 5-methyl-1-hexadecene, 1-octadecene, 2-methyl-1-octadecene, 1-eicosene, 2-methyl-1-eicosene, 1-docosene, 1-tetracosene, 1-hexacosene, vinylcyclohexane and 2-phenyl-1-butene, although the present disclosure is in no way limited to these examples and can include other monomers, such as acrylates, methacrylates, styrenes, dienes, vinyl ethers, vinyl acetate, acrylonitrile and the like, although not all such monomers may be equally effective or efficient under all, or even similar conditions. The alkene monomers to be polymerized by the process of the present disclosure may be linear or branched and may also contain a cycloaliphatic or aromatic ring structure. These monomers can be used singly or as admixture of two or more than two.

In a preferred embodiment, the alkene monomers are fluorine substituted alkene monomers. Illustrative fluorine substituted alkene monomers include, for example, vinylidene fluoride (VDF), hexafluoropropene, tetrafluoroethylene, trifluorochloroethylene, $CF_2=CCl_2$, $CH_2=CFCl$, $CF_2=CFX$ (X=Cl, Br), $CH_2=CX_2$, $CH_2=CHX$, $CH_2=CFH$ and VDF random copolymers with $CF_2=CF(CF_3)$, $CF_2=CF(OCF_3)$, as well as any possible permutation of alkenes with halides as well as fluorinated styrenes, acrylates and vinyl ethers, such as vinyl acetate. Also included are halogenated alkenes with the general formulas: CH2C(CF3)X, CH2C(CF3)COOR (Ralkyl, aryl etc.) $CH_2=CHX$, $CH_2=CX_2$, $CHX=CY_2$, $CH_X=CYX$, $CX_2=CY_2$, $CXY=CY_2$ where X and Y=F, Cl, Br, and I. These monomers can be used singly or as admixture of two or more than two.

In accordance with this disclosure, other monomers, e.g., vinyl monomers, can be polymerized and/or copolymerized. Examples of the monomers include but not limited to:

carboxyl group-containing unsaturated monomers such as acrylic acid, methacrylic acid, crotonic acid, itaconic acid, maleic acid, fumaric acid, and the like (preferably methacrylic acid), $C_{2-8}$ hydroxy alkyl esters of (meth)acrylic acid (preferably methacrylic acid) such as 2-hydroxylethyl(meth)acrylate, 2-hydroxylpropyl(meth)acrylate, 3-hydroxypropyl (meth)acrylate, hydroxybutyl(meth)acrylate and the like, monoesters between a polyether polyol (e.g., polyethylene glycol, polypropylene glycol or polybutylene glycol) and an unsaturated carboxylic acid (preferably methacrylic acid); monoethers between a polyether polyol (e.g., polyethylene glycol, polypropylene glycol or polybutylene glycol) and a hydroxyl group-containing unsaturated monomers (e.g., 2-hydroxyl methacrylate); adducts between an unsaturated carboxylic acid and a monoepoxy compound; adducts between glycidyl (meth)acrylates (preferably methacrylate) and a monobasic acid (e.g., acetic acid, propionic acid, p-t-butylbenzonic acid or a fatty acid).

Other monomers include, for example, monoesters or diesters between an acid anhydride group-containing unsaturated compounds (e.g., maleic anhydride or iraconic anhydride) and a glycol (e.g. ethylene glycol, 1,6-hexanediol or neopentyl glycol); chlorine-, bromine-, fluorine-, and hydroxyl group containing monomers such as 3-chloro-2-hydroxylpropyl(meth)acrylate (preferably methacrylate) and the like; $C_{1-24}$ alkyl esters or cycloalkyl esters of (meth)acrylic acid (preferably methacrylic acid), such as methyl methacrylate, ethyl methacrylate, propyl methacrylate, isopropyl methacrylate, n-, sec-, or t-butyl methacrylate, hexyl methacrylate, 2-ethylhexyl methacrylate, octyl-methacrylate, decyl methacrylate, lauryl methacrylate, stearyl methacrylate, cyclohexyl methacrylate and the like, $C_{2-18}$ alkoxyalkyl esters of (meth)acrylic acid (preferably methacrylic acid), such as methoxybutyl methacrylate, methoxyethyl methacrylate, ethoxyethyl methacrylate, ethoxybutyl methacrylate and the like; olefins or diene compounds such as ethylene, propylene, butylene, isobutene, isoprene, chloropropene, fluorine containing olefins, vinyl chloride, and the like.

Still other monomers include, for example, ring-containing unsaturated monomers such as styrene and o-, m-, p-substitution products thereof such as N,N-dimethylaminostyrene, aminostyrene, hydroxystyrene, t-butylstyrene, carboxystyrene and the like, a-methyl styrene, phenyl(meth) acrylates, nitro-containing alkyl(meth)acrylates such as N,N-dimethyl-aminoethyl methacrylate, N-t-butylaminoethyl methacrylate; 2-(dimethylamino)ethyl methacrylate, methyl chloride quaternized salt, and the like; polymerizable amides such as (meth)acrylamide, N-methyl(meth)acrylamide, 2-acryloamido-2-methyl-1-propanesulfonic acid, and the like; nitrogen-containing monomers such as 2-, 4-vinyl pyridines, 1-vinyl-2-pyrrolidone, (meth)acrylonitrile, and the like; glycidyl group-containing vinyl monomers such as glycidyl(meth)acrylates and the like, vinyl ethers, vinyl acetate, and cyclic monomers such as methyl 1,1-bicyclobutanecarboxylate. These monomers can be used singly or as admixture of two or more than two.

The metal carbonyl catalyst which may be employed may be any of the known metal carbonyls which are known to photolyze into metalloradicals, the following including the carbonyls of rhenium, manganese, tungsten, molybdenum, iron, cobalt and the like. The carbonyls form metalloradicals which are known to abstract halides. Preferred as the carbonyl is $Mn_2(CO)_{10}$ which undergoes facile thermolysis as well as RT photolysis even in the absence of sensitizers. When subjected to near-UV and visible longer wavelength light, $Mn_2(CO)_{10}$ provides the $Mn(CO)_5^•$.

While high temperature ethyleneation, azidation, and block copolymer synthesis via ATRP or IDT were previously attempted from PVDF—I, all such endeavors were fundamentally incomplete, due to the failure of the respective chemistries to activate the stronger and dominant —CF2-CH2-I terminus. Thus, the products were always inseparable, ill-defined mixtures. By contrast, it has been found that metal carbonyls, and by way of example $Mn(CO)5•$ affords the clean and quantitative activation of both —CH2-CF2-I and —CF2-CH2-I chain ends, and enables the synthesis of well-defined block copolymers.

The halide initiator can be selected from any of the following groups of halides, where X is a halide (e.g., chlorine, bromine, iodine) or a pseudohalide ($N_3$, NCS, S(CS)R etc.) and Y is a halide different from X. The groups of halides include: R—X, X—R—X, $CH_2$=CH—$CH_2$—X, NC—CH(R)—X, $(CH_2$—$CO)_2$N—X, Ar—X, $C_6H_5$—CH$(CH_3)$—X, $C_6H_4(CH_2$—X$)_2$, $C_6F_5$—$CF_2$—X, $(CH_3)_2$C(COOEt)-X, $CF_2$(COOEt)-X, $CH_2X_2$, $X_2$CH—$CHX_2$, $CHX_3$, $CCl_3$—X, $X_3$C—$CX_3$, $CX_4$, R—$SO_2$—X, $R_F$—$SO_2$—X, Ar—$SO_2$—X, $R_F$—CO—X, $R_F$—$CH_2$—X, X—$CF_2$—$CH_2$—$CF_2$—X, $R_F$—X,X—$R_F$—Y, X—$R_F$—X, X—$R_F$—CFXY, X—$R_F$—$CFX_2$, X—$(R_F$—$CFX)_n$—X, $(CF_3)_2$CF—X, and $(CF_3)_3$C—X. In the foregoing formulas, $R_F$ is defined as a semi- or perfluorinated fragment/substrate. Also useful are multifunctional systems such as $R(R_F$—$I)_3$ and the like which enable the production of star polymers/copolymers. While not all of the halides worked equally well at very low temperatures or ambient or slightly elevated pressures, or in all ratios of catalyst/initiator/monomer, all would be expected to work at, e.g., elevated temperatures and/or pressures and in ratios which will not be the subject of undue experimentation for one of skill in the art.

The reaction may be carried out at temperatures of from about 0° C. or below to about 100° C. or above, at ambient or elevated pressures. For convenience, most of the examples disclosed herein were conducted at about 40° C., and at a slightly elevated temperature as a result of conducting the polymerization reactions in sealed glass tubes in a warm oil bath.

DESCRIPTION OF THE PREFERRED EMBODIMENTS

In the experiments that follow, the following materials, procedures and analyses were employed.
1. Materials:

Manganese carbonyl ($Mn_2(CO)_{10}$, 98%); Vinylidene fluoride (VDF, 99.9%); 2-Iodoheptafluoropropane (PFIPI, 97%); 1-iodononafluorobutane (perfluorobutyl iodide: PFBI, 98%); Ethyl bromodifluoroacetate (EBDFA, 99%); 1,1,2-trichlorotrifluoroethane (TCTFE, 99%); 1,1,1,3,3-pentafluorobutane (99%); 3-iodo-1,1,2,2-tetrafluoropropane (98%); 1,8-dichloroperfluorooctane (99%); iodotrifluoromethane (CF3I, 99%); 1,6-diiodododecafluorohexane (98%); 1,2-dichloro-1,1,2-trifluoro-2-iodoethane (90+%); hexafluorobenzene (HFBz, 99+%); 1,4-dibromooctafluorobutane (98%); hexafluoropropene (HFP, 99%), chlorotrifluoroethylene (CTFE, 99%); bromotrifluoroethylene (BTFE, 98%); ethyl iododifluoroacetate (EIDFA, 97%); heptafluorobenzyl iodide (97%); iodoperfluoro-tert-butane (97%); 1,2-diiodotetrafluoroethane (97%); 1,3-dibromo-1,1,3,3-tetrafluoropropane (97%), carbon tetrabromide (CBr4, 98%); heptafluorobutyryl chloride (98%); 1,4-diiodoperfluorobutane (98%); chloroform (CHCl3, stabilized with ca. 1% ethanol); 4-methoxybenzenesulfonyl chloride (MBSC, 99%); iodoform (CHI3 99+%); dimethyl sulfoxide (DMSO, 99.8%); 4-iodoanisole (98%); ethyl 2-bromoisobutyrate (EBIB, 98%); thymol iodide, 1,4-dioxane (99.7%); N,N'-dimethylacetamide (DMAc, 99%); ethylene carbonate (EC, +99%); ε-caprolactone (CL, 99%); benzonitrile (BN, 99%, extra pure); 4-methyl-2-pentanone (reagent grade ACS); isopropanol (99.5%); vinyl acetate (VAc, 99+%); acrylonitrile (99+%); styrene (99%); methyl acrylate (MA, 99%); iodomethane (CH$_3$I, Reagent Plus, 99.5%); bromotrichloromethane (BrCCl$_3$, 99%); 1-Iodohexane (98+%); halocarbon oil 27; methanesolfonyl chloride (≥99.7%); N-iodosuccinimide (NIS, 95%); hexachloroethane (99%), trifluoromethanesulfonyl chloride (≥99%); α,α,α-trifluorotoluene (TFT, 99%); bromoform (CHBr$_3$, ≥99%); acetonitrile (ACN, 99%); iodoacetonitrile (98%); 1H,1H,7H-dodecafluoroheptyl acrylate (95%); 2-bromopropionitrile (97%); dimethyl carbonate (DMC, 99% anhydrous); 2-butanone (ACS reagent, ≥99%); trimethyl phosphate (TMP, 99+%); diethyl carbonate (DEC, ≥99%); β-butyrolactone (98+%); γ-butyrolactone (Reagent Plus, ≥99%); propylene carbonate (PC, 99.7%, HPLC grade); methanol (99%); anisole (99.7%); tert-butanol (anhydrous 99.5%); dichloromethane (anhydrous>99.5%); 1,2-dichloroethane (anhydrous 99.8%); o-cresol (99%); ethyl acetate (anhydrous, 99.8%); cyclopentanone (99%); allyliodide (98%); 1,1,1,3,3,3-hexafluoro-2-propanol (HFIPA>99%); (1-bromoethyl)benzene (BEB, 97%); 2-iodo-2-methylpropane (copper-stabilized, 95%); diethylene glycol dimethyl ether (diglyme), anhydrous 99.5%); carbon tetraiodide (97%); 1,3-butadiene (≥99%); allylbromide (>98%); α,α'-dibromo-p-xylene (DBPX, ≥98%); tetramethylurea (≥99.0%); N-bromosuccinimide (NBS, >95%); poly(ethylene oxide) 2000 (PEO 2 k); vinyl chloride (≥99.5%); δ-valerolactone (99%); 1,10-diiododecane (97%); di-tert-butyldicarbonate (99%); allylchloride (98%); carbon tetrachloride (CCl$_4$,); acetic anhydride (certified A.C.S.); N,N'-dimethylformamide (DMF, 99.9%); trifluoroacetic anhydride (reagent grade); diethylene glycol monoethyl ether (lab grade); diethyl ether (anhydrous, 99%); acetone-d6 (99.9%); tetrahydrofuran (THF, 99%); ethyl-2-iodoisobutyrate (EIIB) and α,α'-diiodo-p-xylene (DIPX) were prepared from ethyl-2-bromoisobutyrate (EBIB, 98%) and α,α'-dibromo-p-xylene (DBPX, ≥98%) using NaI (99%) as described in the literature.

2. Techniques:

$^1$H NMR (500 MHz) spectra were recorded on a Bruker DRX-500 and $^{19}$F NMR (400 MHz) spectra were recorded on a Bruker DRX-400 at 24° C. in acetone-d6. GPC analyses were performed on a Waters gel permeation chromatograph equipped with a Waters 2414 differential refractometer and Jordi 2 mixed bed columns setup at 80° C. DMAc (Fisher, 99.9% HPLC grade) was used as eluent at a flow rate of 1 ml/min. Number-average (Mn) and weight-average (Mw) molecular weights were determined from calibration plots constructed with polymethylmethacrylate (PMMA) standards. All reported polydispersities (PDIs) are those of water-precipitated samples. While narrower PDIs could be obtained from MeOH precipitation, this may also lead to partial fractionation, especially for lower molecular weight samples.

3. Polymerizations:

General polymerization procedures are set out below.

a. PVDF Homopolymerization:

In a typical reaction, into a 35-mL Ace Glass 8648#15 Ace-Thread pressure tube equipped with a bushing, and plunger valve with two O-rings, and containing a magnetic stir bar, Mn$_2$(CO)$_{10}$ (53.6 mg, 0.14 mmol) and solvent (e.g., DMC, 3 mL) were degassed with He and placed in a liquid nitrogen bath. He was used for degassing, as N2 or Ar would actually condense in the tube in a liquid nitrogen bath. The tube was subsequently opened, and the initiator (e.g. CF$_3$—(CF$_2$)$_3$-I (PFBI) 0.12 mL, 0.69 mmol) was added, followed by the condensation of VDF (1.1 g, 17.2 mmol) directly into the tube, which was then re-degassed with He. The amount of condensed VDF was determined by weighing the closed tube before and after the addition of the monomer. The tube was then placed behind a plastic shield, in a temperature-controlled, thermostated oil bath illuminated with a commercial GE Helical 26 W fluorescent white light Hg spiral bulb, from about 2-4 cm (see, FIG. 1, for polymerization set-up). For polymerization kinetics, identical reactions were set up simultaneously and stopped at different polymerization times. At the end of the reaction, the tube was carefully placed in liquid nitrogen, slowly opened behind the shield, and allowed to thaw to room temperature in the hood, with the concomitant release of unreacted VDF. The contents were poured into water, filtered and dried. The polymer was than dissolved in DMAC, and the residual Mn inorganic (which may interfere with the NMR signals) was removed by column chromatography. The polymer was finally reprecipitated in water, filtered and dried. While precipitation in MeOH is feasible, it will also lead to fractionation and narrowing of the polydispersity by about 0.2, especially on lower molecular weight samples. Thus, all reported GPC results are from water precipitation. The monomer conversion was determined as the ratio of the differences of the tube weight before and after the reaction and respectively before and after VDF charging (i.e. $C(Wt_{after\ VDF\ condensation} - Wt_{after\ VDF\ release}) / (Wt_{after\ VDF\ condensation} - Wt_{before\ VDF\ addition})$, as well as the ratio of the dry polymer to the condensed VDF. Both procedures gave conversions within <5% of each other. In this particular example, the reaction time was 16 h, Mn4,015, Mw/Mn1.31.

b. Synthesis of poly(VDF-co-HFP) Random Copolymers:

An identical setup was used as above, except VDF (2.2 g, 34 mmol) was first condensed in the tube, followed by HFP (1.3 g, 8.6 mmol). The tube was degassed and the polymerization was carried out 40° C. under visible light irradiation. After a given amount of time, the solution was precipitated in cold hexane, filtered and dried. Mn2,764; PDI1.85; conversion56%, corresponding to the third point in the kinetic in FIG. 4(a).

c. Synthesis of PVDF Block Copolymers:

An example of the block synthesis is as follows. A Schlenk tube containing a DMAC solution of PVDF—I or I—PVDF—I (in this case, I—PVDF—I) formed a copolymer having Mn2,500; PDI1.34; with a total halide chain end functionality of F95% ($F_{1,\ Pn-CH2-CF2-I}$0.64 and $F_{2,\ Pm-CF2-CH2-I}$0.31, 100 mg, 0.05 mmol in 2 mL of DMAC). A second monomer (e.g., styrene, 215 mg, 2.1 mmol) and Mn$_2$(CO)$_{10}$ (36 mg, 0.1 mmol) were added and the mixture was degassed under Ar then heated to 110° C. under visible light irradiation for 5 hours. The solution was precipitated in MeOH, filtered and dried. Mn14,500; PDI2.25; conversion67%; and composition of the block copolymer was approximately VDF/St30/70. The NMR spectroscopy of the block copolymers are set forth in FIG. 3, and the composition thereof in the table below.

Using the general polymerization procedures described above, the following specific experimental results were obtained. Mn$_2$(CO)$_{10}$-mediated VDF polymerizations are set forth in Table 1 below. Experiments 1-4 were control experiments (no initiator or catalyst (Ex. 1); no initiator (Ex. 2); no catalyst (Ex. 3); dark conditions (Ex. 4)). The temperature effect (Ex. 5-16), initiator effect (Ex. 17-42), the monomer/initiator ratio effect [VDF]/[I] (Ex. 43-49), and other monomers (Ex. 50-52) were surveyed. All polymerization temperatures were 40° C. unless otherwise noted.

TABLE 1

| Exp# | Initiator | [VDF]/[I]/[Mn2(CO)10] | Time | Conv. (%) | Mn | PDI | $kp^{app}$(h-1) |
|---|---|---|---|---|---|---|---|
| 1 | — | 25/0/0 | 63 | 0 | — | — | — |
| 2 | — | 25/0/0.2 | 64 | 0 | — | — | — |
| 3 | CF3—(CF2)2—CF2—I | 25/1/0 | 20 | 0 | — | — | — |
| 4 | CF3—(CF2)2—CF2—I (a) | 25/1/0.2 | 93 | 0 | — | — | — |
| 5 | CF3—(CF2)2—CF2—I | 25/1/0.2 | 22 | 81 | 1,700 | 1.41 | 0.074 |
| 6 | CF3—(CF2)2—CF2—I (h) | 25/1/0.2 | 11 | 67 | 2,316 | 1.57 | 0.050 |
| 7 | CF3—(CF2)2—CF2—I (b) (i) | 50/1/0.15 | 36 | 10 | 1,044 | 1.33 | 0.002 |
| 8 | CF3—(CF2)2—CF2—I (b) | 25/1/0.15 | 96 | 16 | 1,860 | 1.26 | 0.094 |
| 9 | CF3—(CF2)2—CF2—I | 25/1/0.2 | 22 | 87 | 2,300 | 1.49 | 0.017 |
| 10 | I—CF2—(CF2)4—CF2—I | 50/1/0.1 | 33 | 42 | 2,527 | 1.34 | 0.058 |
| 11 | CF3—(CF2)2—CF2—I | 25/1/0.2 | 18 | 65 | 3,100 | 1.79 | 0.004 |
| 12 | CF3—(CF2)2—CF2—I (b) | 50/1/0.15 | 64 | 23 | 1,353 | 1.29 | 0.004 |
| 13 | I—CF2—(CF2)4—CF2—I (j) | 50/1/0.1 | 14 | 58 | 2,386 | 1.42 | 0.062 |
| 14 | CF3—(CF2)2—CF2—I (k) | 50/1/0.2 | 4 | 60 | 2,018 | 1.55 | 0.223 |
| 15 | CF3—(CF2)2—CF2—I (b) (l) | 25/1/0.15 | 24 | 40 | 998 | 1.28 | 0.021 |
| 16 | CF3—(CF2)2—CF2—I (b) (m) | 50/1/0.15 | 27 | 40 | 852 | 1.32 | 0.019 |
| 17 | CF3SO2Cl (b) | 20/1/0.1 | 75 | 10 | 606 | 1.85 | 0.001 |
| 18 | CHCl3 | 50/1/0.2 | 63 | 0 | 13,275 | 1.65 | 0.004 |
| 19 | CCl3Br | 25/1/0.2 | 64 | 4 | 2,500 | 2.09 | 0.007 |
| 20 | Cl3C—CCl3 | 25/1/0.2 | 68 | 71 | 5,000 | 1.86 | 0.018 |
| 21 | CCl4 | 25/1/0.5 | 17 | 56 | 5,005 | 1.36 | 0.050 |
| 22 | CF3—(CF2)2—CO—Cl | 50/1/0.2 | 62 | 11 | 7,416 | 2.03 | 0.002 |
| 23 | Cl—FClC—CF2—I | 50/1/0.2 | 10 | 53 | 7,282 | 2.17 | 0.079 |
| 24 | Cl—(CF2—CFCl)3-6—Cl | 50/1/0.5 | 21 | 56 | 10,498 | 1.80 | 0.039 |
| 25 | Cl—(CF2)8—Cl | 25/1/0.25 | 40 | 19 | 9,332 | 1.74 | 0.005 |
| 26 | Br—CF2—CH2—CF2—Br | 50/1/0.15 | 37 | 40 | 4,112 | 2.31 | 0.014 |
| 27 | EtOOC—CF2—Br | 30/1/0.25 | 44 | 24 | 3,386 | 1.94 | 0.006 |
| 28 | Br—(CF2)4—Br (b) | 20/1/0.4 | 5 | 84 | 2,700 | 2.69 | 0.367 |
| 29 | CH3I | 50/1/0.5 | 21 | 42 | 6,334 | 1.83 | 0.026 |
| 30 | CH3—(CH2)5—I | 25/1/0.5 | 63 | 24 | 3,050 | 2.06 | 0.004 |
| 31 | I—CH2—(CH2)8—CH2—I | 50/1/0.8 | 120 | 28 | 11,000 | 2.43 | 0.003 |
| 32 | HCF2—CF2—CH2—I | 100/1/0.5 | 16 | 49 | 4,394 | 1.88 | 0.042 |
| 33 | EtOOC—CF2—I | 25/1/0.2 | 62 | 84 | 1,194 | 1.71 | 0.030 |
| 34 | C6F5—CF2—I | 50/1/0.75 | 70 | 50 | 2,621 | 2.43 | 0.010 |
| 35 | CF3I (b) | 50/10/0.2 | 42 | 30 | 1,350 | 1.21 | 0.008 |
| 36 | CF3—CF2—I (b) | 50/1/0.1 | 24 | 16 | 1,500 | 1.27 | 0.007 |
| 37 | (CF3)2CF—I (b) | 50/1/0.5 | 20 | 44 | 3,600 | 1.60 | 0.029 |
| 38 | (CF3)3C—I | 25/1/0.2 | 85 | 59 | 2,494 | 1.88 | 0.010 |
| 39 | Cl—CF2—CFCl—I | 25/1/0.2 | 14 | 88 | 1,900 | 1.72 | 0.153 |
| 40 | Cl—CF2—(CF2)4—CF2—I (b) | 50/1/0.3 | 40 | 58 | 1,400 | 1.56 | 0.220 |
| 41 | I—CF2—(CF2)2—CF2—I | 25/1/0.4 | 6 | 7 | 1,827 | 1.68 | 0.340 |
| 42 | I—CF2—(CF2)4—CF2—I | 50/1/0.4 | 8 | 78 | 3,193 | 1.50 | 0.189 |
| 43 | I—CF2—(CF2)4—CF2—I | 25/1/0.1 | 8 | 86 | 1,680 | 1.24 | 0.246 |
| 44 | I—CF2—(CF2)4—CF2—I | 50/1/0.1 | 15 | 68 | 3,903 | 1.42 | 0.076 |
| 45 | I—CF2—(CF2)4—CF2—I (c) | 100/1/0.1 | 12 | 72 | 6,607 | 1.53 | 0.106 |
| 46 | I—CF2—(CF2)4—CF2—I (d) | 200/1/0.4 | 1.5 | 32 | 7,421 | 1.32 | 0.257 |
| 47 | I—CF2—(CF2)4—CF2—I (d) | 500/1/0.4 | 16 | 38 | 13,216 | 1.58 | 0.026 |
| 48 | I—CF2—(CF2)4—CF2—I (c) | 1000/1/0.2 | 20 | 37 | 21,232 | 1.60 | 0.028 |
| 49 | I—CF2—(CF2)4—CF2—I (c) | 5000/1/0.4 | 7 | 11 | 23,050 | 1.75 | 0.001 |
| 50 | CF3—(CF2)2—CF2—I (e) | 80/20/1/0.2 | 60 | 56 | 2,764 | 1.85 | 0.014 |
| 51 | CF3—(CF2)2—CF2—I (f) | 25/1/0.2 | 18 | 59 | 1,945 | 1.24 | 0.050 |
| 52 | CF3—(CF2)2—CF2—I (g) | 50/1/1 | 40 | 10 | 6,154 | 1.71 | 0.003 |
| 53 | CF3—(CF2)2—CF2—I (n) | 100/1/0.5 | 46 | 85 | 700 | 1.27 | 0.041 |
| 54 | CF3—(CF2)2—CF2—I (o) | 50/1/0.5 | 72 | 45 | 500 | 1.75 | 0.008 |
| 55 | CF3—(CF2)2—CF2—I (j) | 80/20/1/0.2 | 60 | 56 | 2,800 | 1.85 | 0.014 |
| 56 | CF3—(CF2)2—CF2—I (k) | 70/30/1/0.5 | 43 | 44 | 1,900 | 1.99 | 0.013 |

Legend: all experiments in DMC (VDF/DMC = 1 mL/3 mL), unless otherwise noted.
(a) Dark conditions;
(b) CAN;
(c) VDF/DMC = 4 mL/6 ml;
(d) VDF/DMC = 1.5 ml/3 ml;
(e) [VDF]/[HFP]/CF3-(CF2)2—CF2—I]/[Mn2(CO)10];
(f) Monomer is CF2 = CFCl;
(g) Monomer is CF2 = CFBr;
(h) 0° C.;
(i) 25° C.;
(j) 65° C.;
(k) 75° C.;
(l) 80° C.;
(m) 100° C.;
(n) CCl$_2$ = CF$_2$;
(o) CH2 = CFH;
(p) VDF/HFP;
(q) VDF/CF$_2$ = CF(OCF$_3$).

As can be seen from the above set of experiments, temperatures from 0° C.-100° C. were used effectively and are believed to be suitable for the polymerization reaction in most cases. Low temperature and pressured polymerizations provide an inexpensive, convenient method for exploring gaseous FM polymerizations at RT, in glass tubes. This allows faster optimization and increased efficiency versus expensive large scale high pressure metal reactors, since a large number of polymerizations can be carried out concurrently. Of course, higher temperatures and pressures can be used for those initiator/catalyst combinations which may require those conditions to achieve desired results. The present inventor selected 40° C. for the bulk of all further experiments, as a good compromise between rate, minimization of possible higher temperature side reactions and a safe pressure inside the tube. The monomer/initiator ratio effect [VDF]/[I] is plotted is FIG. 3.

In another set of experiments, an evaluation of solvent effect on $Mn_2(CO)_{10}$ photomediated VDF polymerization was studied. The solvents studied for their effect and the results are shown in Table 2 below. In all of the polymerizations below, the reaction mixture (monomer/initiator/catalyst system and ratio were the same): [VDF]/[$CF_3$—$CF_2$—$CF_2$—$CF_2$—I]/$Mn_2(CO)_{10}$ 25/1/0.2, as was the temperature, T40° C.

TABLE 2

Examples 30-38 are shown in graph form in Figure 7, reflecting the effect on reaction rate of VDF/DMC ratios. Typical VDF reactions are carried out in the non-solvent acetonitrile ACN, but it was discovered that DMC was a much better reaction medium.

| Exp. | Solvent | Time (Hrs) | Conv (%) | kpapp(h-1) | Mn | PDI |
|---|---|---|---|---|---|---|
| 1 | 2-Butanone | 72 | 10 | 0.001 | 1,733 | 1.12 |
| 2 | DMF | 74 | 13 | 0.002 | 2,761 | 1.15 |
| 3 | 4-Methyl-2-pentanone | 72 | 15 | 0.002 | 1,532 | 1.12 |
| 4 | DMSO | 74 | 17 | 0.003 | 2,793 | 1.07 |
| 5 | PEO (Mn = 2000) | 63 | 15 | 0.003 | 1,000 | 1.19 |
| 6 | DMAc | 21 | 8 | 0.004 | 3,676 | 1.19 |
| 7 | δ-Valerolactone | 21 | 12 | 0.006 | 462 | 2.74 |
| 8 | tBu-OH | 17 | 10 | 0.006 | 588 | 1.29 |
| 9 | Ethyl acetate | 63 | 42 | 0.009 | 1,400 | 1.21 |
| 10 | CH2Cl2 | 18 | 18 | 0.011 | 713 | 1.30 |
| 11 | Acetic anhydride | 48 | 42 | 0.011 | 1,000 | 1.21 |
| 12 | γ-Butyrolactone | 21 | 26 | 0.014 | 676 | 1.26 |
| 13 | 1,2-dichloroethane | 20 | 27 | 0.016 | 778 | 1.47 |
| 14 | Trimethylphosphate | 16 | 21 | 0.015 | 3,218 | 1.18 |
| 15 | Pentafluorobutane | 20 | 26 | 0.015 | 1,010 | 1.48 |
| 16 | MeOH | 17 | 24 | 0.016 | 781 | 1.45 |
| 17 | Hexafluorobenzene | 14 | 21 | 0.017 | 600 | 1.39 |
| 18 | Acetonitrile | 22 | 41 | 0.024 | 1,208 | 1.35 |
| 19 | β-Butyrolactone | 21 | 40 | 0.024 | 986 | 1.39 |
| 20 | ε-Caprolactone | 21 | 40 | 0.024 | 1,074 | 1.28 |
| 21 | H2O | 18 | 41 | 0.029 | 827 | 1.63 |
| 22 | Diethyl carbonate | 22 | 48 | 0.030 | 2,627 | 1.13 |
| 23 | Propylene carbonate | 17 | 43 | 0.033 | 813 | 1.41 |
| 24 | Ditbutyldicarbonate | 21 | 50 | 0.033 | 910 | 1.40 |
| 25 | Ethylene carbonate | 17 | 58 | 0.051 | 1,186 | 1.79 |
| 26 | Heptafluoroisopropyl alcohol | 23 | 78 | 0.066 | 1,377 | 1.37 |
| 28 | Acetone | 8 | 47 | 0.079 | 1,007 | 1.33 |
| 29 | Dimethyl carbonate | 16 | 84 | 0.114 | 4,015 | 1.31 |
| 30 | VDF/DMC 1 mL/1 mL | 18 | 80 | 0.089 | 1,273 | 1.80 |
| 31 | VDF/DMC 1 mL/3 mL | 18 | 85 | 0.105 | 1,407 | 1.71 |
| 32 | VDF/DMC 1 mL/6 mL | 18 | 81 | 0.092 | 1,224 | 1.58 |
| 33 | VDF/DMC 1 mL/12 mL | 18 | 83 | 0.098 | 1,674 | 1.47 |
| 34 | VDF/DMC 1 mL/3 mLa) | 48 | 30 | 0.007 | 871 | 1.33 |
| 35 | VDF/DMC 2 mL/3 mLa) | 7 | 33 | 0.057 | 1,110 | 1.48 |
| 36 | VDF/DMC 2 mL/6 mLa) | 7 | 36 | 0.062 | 1,100 | 1.44 |
| 37 | VDF/DMC 4 mL/3 mLa) | 2 | 50 | 0.308 | 1,835 | 1.63 |
| 38 | VDF/DMC 4 mL/12 mLa) | 2 | 54 | 0.324 | 2,100 | 1.68 |

The comparison between apparent rates of reaction $k_p^{app}$ for the "standard" reaction medium ACN and for DMC are set forth in FIG. 6, and the $k_p^{app}$ for each of the tested reaction media are plotted in FIG. 7.

Characterization of $Mn_2(CO)_{10}$ Photomediated Synthesis of PVDF Block Copolymers are shown in Table 3 below.

TABLE 3

| Exp. | Monomer | PVDFI or I-PVDFI Mn | PDI | [M]/[PVDFI]/ [$Mn_2(CO)_{10}$] | Conv (%) | Composition M/VDF | $M_n$ | PDI |
|---|---|---|---|---|---|---|---|---|
| 1 | Styrene (a, b) | 2,500 | 1.34 | 60/1/2 | 67 | 70/30 | 14,500 | 2.25 |
| 2 | Butadiene (b) | 1,400 | 1.48 | 200/1/1 | 25 | 62/38 | 4,700 | 2.00 |
| 3 | Vinyl Chloride (c) | 1,800 | 1.29 | 100/1/1 | 35 | 77/23 | 20,100 | 1.52 |
| 4 | Vinyl Acetate | 1,500 | 1.49 | 100/1/0.2 | 30 | 65/35 | 11,047 | 1.70 |
| 5 | Methyl Acrylate | 2,300 | 1.52 | 75/1/4 | 40 | 72/28 | 8,970 | 2.46 |
| 6 | Acrylonitrile (a) | 2,074 | 1.31 | 50/1/1 | 25 | 74/26 | 25,800 | 2.33 |

T = 40° C. and solvent = DMAC except where noted.
(a) Block copolymers from I-PVDF-I samples.
(b) Polymerization was carried out at 110° C.
(c) In dioxane.

NMR Discussion:

Examples of the $d_6$-acetone, $^1$H-NMR PVDF spectra are presented in FIG. 5 (R—X, $R_F$—X, X=Cl, Br). In addition to known PVDF resonances, acetone is seen at δ2.05 ppm and $H_2O$ at δ2.84 ppm. The other sets of signals are associated with PVDF propagation and termination events and respectively with the specific initiator used.

PVDF Main Chain Resonances:

Two dominant, propagation derived PVDF main chain signals are observed. First, the head to tail (HT), —$CF_2$—[$CH_2$—$CF_2$]$_n$—$CH_2$—, broad multiplet a, appears at δ2.8-3.1 ppm. Second, the head to head (HH) —($CH_2$—$CF_2$)$_n$—$CF_2$—$CH_2$—$CH_2$—$CF_2$—($CH_2$—$CF_2$)$_m$— linkage (typically HH5-10% in free radical VDF polymerizations), a', is observed at δ2.3-2.4 ppm. Conversely, the resonances derived from typical PVDF termination by the recombination of terminal HT or HH units cannot be easily identified due to overlap, as follows: HT/HT (—$CH_2$—$CF_2$—$CH_2$—$CF_2$—$CF_2$—$CH_2$—$CF_2$—$CH_2$—, overlap with the HT main chain), HT/HH (—$CH_2$—$CF_2$—$CH_2$—$CF_2$—$CH_2$—$CF_2$—$CF_2$—$CH_2$—, identical to HT propagation), or HH/HH (—$CH_2$—$CF_2$—$CF_2$—$CH_2$—$CH_2$—$CF_2$—$CF_2$—$CH_2$—, identical to HH propagation). Interestingly, such termination is dramatically suppressed in the presence of active perfluoroiodo CT agents, and is visualized by the disappearance of the HH peak a' which becomes —$CF_2$—$CH_2$—I (c' vide infra).

Initiator Chain Ends:

The second set of signals, b and b' correspond to the first VDF unit connected with $R_F$ ($R_F$—$CH_2$—$CF_2$—) and the $R_H$ initiator fragment, and confirm the predominantly regiospecific 1,2-connectivity ($R_F$—$CH_2$—$CF_2$—) and favored for larger size of R or $R_F$.

Halide Chain Ends:

The c and c' resonances represent the corresponding PVDF halide chain ends (i.e. HT: c, —$CH_2$—$CF_2$—$CH_2$—$CF_2$—X and HH: c', —$CH_2$—$CF_2$—$CF_2$—$CH_2$—X), and, in essence, quantify the CT ability of the initiator. Since $Mn(CO)_5$—X is not a halide donor, the concentration of c and c' may decrease with increasing the amount of $Mn_2(CO)_{10}$ employed. Their ratio will also depend on conversion for X=I. The c/c' ratio is less affected by conversion for Cl and Br initiators which are not capable of DT under polymerization conditions. However, similarly to VAc, it does change in the favor of the less reactive —$CH_2$—$CF_2$—$CH_2$—X for perfluoroiodo derivatives (FIG. 6, dependence of chain ends on conversion).

H Chain Ends:

While dramatically suppressed in IDT, termination may also occur by H transfer to the HT ~$CH_2$—$CF_2$• or to a smaller extent to the HH ~$CF_2$—$CH_2$• propagating units to form —$CH_2$—$CF_2$—H (peak d, triplet of triplets at δ6.3 ppm $^3J_{HH}$4.6 Hz, $^2J_{HF}$54.7 Hz) and, respectively, —$CH_2$—$CF_2$—$CF_2$—$CH_3$ (peak d', triplet at 1.80 ppm, $^3J_{HF}$19.2 Hz). Such H-transfers may arise from either the solvent, the main chain (inter- or intramolecular), or by disproportionation with the terminal HT unit, to also give a —$CH_2$—$CF_2$—CH=$CF_2$ unsaturation, observed in a few cases as a trace multiplet at b" at ~5.2 ppm.

Solvent-Derived Chain Ends:

Chain transfer to an $R_S$—H solvent may occur by H abstraction leading to the —$CH_2$—$CF_2$—H and —$CF_2$—$CH_2$—H chain ends described above. This will happen especially when the C—X bond of the initiator or the chain end is very strong, i.e. for very weak CT agents.

For most typical $R_S$—H solvents, the resulting $R_S$• radicals are not reactive enough to reinitiate VDF and are consumed by dimerization. Thus, the solvent fragment will not be observed in NMR. This is the case of ACN (NC—$CH_2$—H). Indeed, while $Mn_2(CO)_{10}$ clearly activates the corresponding iodide NC—$CH_2$—I, no polymer is obtained, as the resulting CN-stabilized radical dimerizes without addition to VDF (i.e. chain breaking and transfer without reinitiation) and is thus absent from the NMR of the polymer.

By contrast, a more reactive $CH_3$—O—CO—O—$CH_2$—• radical is generated by H abstraction from DMC. Thus, DMC provides chain transfer with reinitiation, (i.e. without breaking the radical chain) and this can be seen as trace signals for the poor initiators (e.g. $CF_3$—$(CF_2)_2$—CO—Cl) as $CH_3$—O—CO—O—$CH_2$—$CH_2$—$CF_2$— at δ3.74 s, 3H and respectively at δ4.33 ppm, t, 2H. However, this transfer is not observed for the linear perfluoroalkyl iodides suitable for VDF-CRP.

Functionality and Mn Calculations:

Comparative integrations of the a, a' b, c, c', d and d' resonances allow the calculation of the halide and hydride chain end functionality, as well as that of $M_n^{NMR}$, as outlined below.

$$M_n^{NMR} = R_F + \left\{ N \left[ 64.04 \left[ \frac{\int a + \int a' + \int b +}{\int c + \int c' + \frac{2}{3}\int d'} \right] + 1.008 \left( \frac{2\int d + \frac{2}{3}\int d'}{\int b} \right) + Y \left( \frac{\int c + \int c'}{\int b} \right) \right] \right\} \quad (1)$$

$$\% \text{ total Iodine Functionality} = \frac{\int c + \int c'}{\int b} = \frac{\int c + \int c'}{\int c + \int c' + \frac{2}{3}\int d' + 2\int d} \quad (2)$$

$$\% \text{ CH}_2\text{—CF}_2\text{—I Functionality} = \frac{\int c}{\int b} = \frac{\int c}{\int c + \int c' + \frac{2}{3}\int d' + 2\int d} \quad (3)$$

$$\% \text{ CF}_2\text{—CH}_2\text{—I Functionality} = \frac{\int c'}{\int b} = \frac{\int c'}{\int c + \int c' + \frac{2}{3}\int d' + 2\int d} \quad (4)$$

$$\% \text{ CF}_2\text{—CH}_2\text{—H Functionality} = \frac{\frac{2}{3}\int d'}{\int b} = \frac{\frac{2}{3}\int d'}{\int c + \int c' + \frac{2}{3}\int d' + 2\int d} \quad (5)$$

$$\% \text{ CH}_2\text{—CF}_2\text{—H Functionality} = \frac{\int d}{\int b} = \frac{2\int d}{\int c + \int c' + \frac{2}{3}\int d' + 2\int d} \quad (6)$$

Where 1.008 and 64.04, represent the molar masses of H and VDF while Y is the atomic wt of the halide chain end (e.g. Y126.9 for iodine chain ends); N1, 2 (initiator functionality); and $R_F$ is the mol. wt of the initiator fragment (without the halides). All integrals are normalized to 2 protons.

The initiation from each halide is described below as follows:

Cl and Br Initiators:

$CF_3$—$SO_2$—Cl: As for other $R_F$—$SO_2$—Cl derivatives, $SO_2$ extrusion occurs upon radical formation and peak b, $CF_3$—$CH_2$—$CF_2$—$CH_2$—$CF_2$—, is seen at δ3.24 ppm, (tq $^3J_{HF}$10.3 Hz, $^3J_{HF}$5.2 Hz). As described later, this is identical with initiation from $CF_3$—I and similar with most $R_F$—X initiators. Peak c, δ3.44 ppm (tt, $^3J_{HF}$14.6 Hz) corresponds to the HT —$CF_2$—$CH_2$—$CF_2$—Cl chain end, while the —$CF_2$—$CF_2$—$CH_2$—Cl c' chain end is not observed. The high value of f=0.89 reflects the good CT ability of this initiator which has a very labile $SO_2$—Cl bond. Remarkably, very little HH content or H transfer is observed.

CCl4: Since polyhalide radicals add regioselectively onto the $CH_2$ side of VDF, the $CCl_3$—$CF_2$—$CH_2$—$CF_2$—$CH_2$— minor isomer, if any, is probably masked by the main chain. Thus, the dominant $CCl_3$—$CH_2$—$CF_2$—$CH_2$—$CF_2$—, b, is observed at δ3.75 ppm 5 (t, $^3J_{HF}$14.8 Hz) whereas the halide chain end c, —$CH_2$—$CF_2$—Cl is seen at δ3.44 ppm5 (tt, $^3J_{HF}$14.4 Hz) and even traces of —$CF_2$—$CH_2$—Cl (c'7% of d) can be seen at δ4.04 ppm (t, $^3J_{HF}$13.6 Hz). A partial overlap of c with possible difunctional initiation —$CF_2$—$CH_2$—$CCl_2$—$CH_2$—$CF_2$— is seen at δ3.36 ppm (t, $^3J_{HF}$16 Hz). The chain end functionality is f=0.47.

CCl3Br: Similarly to CCl4, the $CCl_3$—$CH_2$—$CF_2$—$CH_2$—$CF_2$—, b, is again observed at δ3.75 ppm (t, $^3J_{HF}$14.8 Hz) whereas the $C_{Br}$, and $C_{Br'}$ bromine chain ends —$CH_2$—$CF_2$—Br and —$CF_2$—$CH_2$—Br are seen at δ3.56 ppm (tt, $^3J_{HF}$15.2 HZ) and δ3.94 ppm (t, $^3J_{HF}$14.4 Hz). Interestingly, Cl-derived —$CH_2$—$CF_2$—Cl and —$CF_2$—$CH_2$—Cl chain ends ($c_{Cl}$ and $c'_{Cl}$) can also be seen at δ4.04 ppm (t, $^3J_{HF}$13.6 Hz) and δ3.45 ppm (q, $^3J_{HF}$14.6 Hz). While the less active —$CF_2$—$CH_2$—Cl appears to be of a similar intensity with —$CH_2$—$CF_2$—Br, this is because the excess $Mn_2(CO)_{10}$ used in this reaction has already irreversibly abstracted Br from the more reactive —$CH_2$—$CF_2$—Br chain end, thus decreasing its concentration. Moreover, trace difunctional initiation can be distinguished (—$CF_2$—$CH_2$—$CCl_2$—$CH_2$—$CF_2$ (δ3.37 ppm, q, $^3J_{HF}$15.6 Hz). As $CCl_3$Br is a much better VDF CT agent than $CCl_4$ a better chain end functionality is expected.

$CCl_3$—$CCl_3$: The connectivity peak b $CCl_3$—$CCl_2$—$CH_2$—$CF_2$— appears at δ3.59 (t, $^3J_{HF}$15 Hz). The c —$CH_2$—$CF_2$—Cl and c' —$CF_2$—$CH_2$—Cl halide chain ends can be seen at δ3.45 ppm, ($^3J_{HF}$14.6 Hz) and δ4.04 ppm (t, $^3J_{HF}$13.6 Hz). Trace difunctional initiation is seen as —$CF_2$—$CH_2$—$CCl_2$—$CCl_2$—$CH_2$—$CF_2$—, δ3.49 ppm ($^3J_{HF}$16.2 Hz), whereas the multiplets at 3.1-3.3 ppm most likely correspond to a combination of $CCl_3$—$CCl_2$—$CH_2$—$CF_2$—$CH_2$—$CF_2$— at δ3.15 ppm and the 2, 1-reverse addition $CCl_3$—$CCl_2$—$CF_2$—$CH_2$—$CF_2$— at 3.25 ppm (quintet, $^3J_{HF}$16.1 Hz).

$CHCl_3$: The initiator connectivity can be observed via the b' resonances of the H—$CCl_2$—$CH_2$—$CF_2$— (t, δ6.37 ppm, $^3J_{HH}$6.1 Hz) 1, 2-addition fragment, partially overlapping with the $CH_2$—$CF_2$—H chain end (d), and via the trace H—$CCl_2$—$CF_2$—$CH_2$ (multiplets at δ6.45 ppm-6.53 ppm) corresponding to the less frequent 2, 1-addition. The first VDF unit b $HCCl_2$—$CH_2$—$CF_2$— is seen at δ3.13 ppm (td $^3J_{HH}$6.2 Hz, $^3J_{HF}$9.8 Hz) while the $HCCl_2$—$CF_2$—$CH_2$— unit is not observed. However, no c or c' halide chain ends were detected since $CHCl_3$ is a much poorer VDF CT agent than $CF_3$—$SO_2$Cl, $CCl_4$ and $CCl_3$Br.

Cl—CFCl—$CF_2$—Cl (Freon): In this case, mono and difunctional initiation is possible and thus the first VDF units b, i.e. Cl—$CF_2$—CFCl—$CH_2$—$CF_2$— and Cl—CFCl—$CF_2$—$CH_2$—$CF_2$— are seen as multiples at δ3.4 ppm and respectively δ3.25 ppm. Conversely, the 2, 1-addition from the more reactive (Cl—CFCl—$CF_2$—Cl) side would afford Cl—$CF_2$—CFCl—$CF_2$—$CH_2$—$CF_2$— with a very similar chemical shift. Again, the c and c' —$CH_2$—$CF_2$—Cl and —$CF_2$—CH2-Cl halide chain ends are absent, indicating that, similarly to $CHCl_3$, Cl—CFCl—$CF_2$—Cl is a poor VDF CT agent.

Halocarbon oil: (Cl—($CF_2$—CFCl)$_{3-6}$—Cl). This oligomeric multifunctional initiator closely resembles Cl—CFCl—$CF_2$—Cl (Freon) and perfluoro isopropyl chloride $CF_3$—CFCl—$CF_3$. Thus, like Freon, the initiator connectivity peak (~$CH_2$—$CF_2$)$_2$CF—$CH_2$—$CF_2$— appears as a multiplet at δ3.4 ppm, whereas initiation from the —$CF_2$—Cl termini of halocarbon oil appears at δ3.25 ppm. While the secondary C—Cl bond here may be weaker than —$CF_2$—Cl, $Mn_2(CO)_{10}$ preferentially activates primary halides. Similarly to all perfluoro chlorides, no —$CF_2$—$CH_2$—Cl or —$CH_2$—$CF_2$—Cl chain ends are seen due to the poor CT ability of this initiator. However, this initiator represents a model for the future synthesis of PVDF stars or grafting of PVDF from polymer halides.

Cl—$CF_2$—$(CF_2)_6$—$CF_2$—Cl: The initiation is demonstrated by the b multiplet at δ3.28 ppm assigned to —$CF_2$—$CH_2$—$(CF_2)_8$—$CH_2$—$CF_2$—. Similarly to all perfluoro chlorides, no —$CF_2$—$CH_2$—Cl or —$CH_2$—$CF_2$—Cl halide chain ends can be seen.

$CF_3$—$(CF_2)_2$—CO—Cl: The $CF_3$—$(CF_2)_2$—CO—$CH_2$—$CF_2$— is most likely overlapping with the PVDF main chain and again no halide chain end is observed.

EtOOC—CF2-Br: The b' initiator peaks ($CH_3$—$CH_2$—O— and $CH_3$—$CH_2$—O— are seen at δ1.33 ppm (t, $^3J_{HH}$7.15 Hz) and at δ4.36 ppm (q, $^3J_{HH}$7.09 Hz), whereas the initiator connectivity is revealed by the EtOOC—$CF_2$—$CH_2$—$CF_2$— resonance b δ3.11 ppm, $^3J_{HF}$15.57 Hz. The —$CF_2$—$CH_2$—$CF_2$—Br is observed at δ3.55 ppm (q, $^3J_{HF}$15 Hz) and the —$CF_2$—$CH_2$—Br resonance is absent. A reasonable chain end functionality f=0.5 is available for this initiator.

Br—$CF_2$—$CH_2$—$CF_2$—Br: The initiator connectivity with PVDF is undetectable as it provides the same structure as the HT main chain. However, the c —$CF_2$—$CH_2$—$CF_2$—Br halide chain end is observed at δ3.55 ppm (q, $^3J_{HF}$15 Hz) while the c' —$CF_2$—$CH_2$—Br resonance is absent, indicating that no DT is in effect (otherwise it would accumulate). This initiator also represents a model of the higher reactivity 1, 2-halide chain end unit.

Br—$CF_2$—$CF_2$—$CF_2$—$CF_2$—Br: The first VDF unit —$(CF_2)_4$—$CH_2$—$CF_2$— is seen at δ3.21 ppm (q, $^3J_{HF}$15 Hz). The —$CF_2$—$CH_2$—$CF_2$—Br halide end is observed at δ3.55 ppm (q, $^3J_{HF}$15 Hz), and again the —$CF_2$—$CH_2$—Br resonance is not observed, indicating that no Br-DT is in effect.

I Initiators:

Alkyl Iodides:

$CH_3$—I: The initiator derived chain ends of the dominant 1, 2-addition are seen as $CH_3$—$CH_2$—$CF_2$— (δ1.02 ppm, $^3J_{HH}$7.5 Hz) and $CH_3$—$CH_2$—$CF_2$— (m, δ2 ppm, under the acetone peak). The less favored 2, 1-addition, $CH_3$—$CF_2$—$CH_2$—$CH_2$—$CF_2$— (t, δ1.55 ppm), or the termination via H abstraction onto a HH unit $CH_3$—$CF_2$—$CF_2$—$CH_2$—$CF_2$— (tt, δ1.80) are not observed. Moreover, no iodine chain ends are detected, indicating that CH3-I is a very poor CT agent.

$CH_3$—(CH2)$_4$-$CH_2$—I: The initiation is demonstrated by the alkyl resonances with $CH_3$—$(CH_2)_5$—, δ0.88 ppm (t, 3H, $^3J_{HH}$7 Hz), $CH_3$—$(CH_2)_4$—$CH_2$—$CH_2$—$CF_2$— δ1.32 (broad multiplet 1.24-1.41 ppm, 6.8H), and $CH_3$—$(CH_2)_4$—$CH_2$—$CH_2$—$CF_2$—, δ1.49 ppm (m, 1.2H). The integral mismatch indicate ~15% 2, 1-addition, where the last methylene of the initiator ($CH_3$—$(CH_2)_4$—$CH_2$—$CF_2$—$CH_2$—$CF_2$—) and the methylene of the first VDF 1, 2-unit ($CH_3$—$(CH_2)_4$—$CH_2$—$CH_2$—$CF_2$—) overlap with acetone. Again, no iodo chain ends are observed.

I—$CH_2$—$(CH_2)_8$—$CH_2$—I: The initiator alkyl peaks are all observed as multiplets as follows: PVDF—$CH_2$—$CH_2$—$CH_2$—$(CH_2)_4$—$CH_2$—$CH_2$—$CH_2$—PVDF—, δ1.31 ppm, PVDF—$CH_2$—$CH_2$—$CH_2$—$(CH_2)_4$—$CH_2$—$CH_2$—$CH_2$—VDF—, δ1.50 ppm, VDF$_n$—$CH_2$—$CH_2$—$CH_2$—$(CH_2)_4$—$CH_2$—$CH_2$—$CH_2$—VDF$_n$—, δ1.60 ppm, and finally PVDF—$CH_2$—$CH_2$—$CH_2$—$(CH_2)_4$—$CH_2$—$CH_2$—$CH_2$—PVDF—, δ1.8 ppm and 2 ppm, depending on the 1, 2- and 2, 1-addition, and overlapping with terminal $CH_3$—$CF_2$— and respectively with acetone. A small $CH_3$—$CH_2$—$(CH_2)_8$—, derived from H chain transfer to the initiator, is also seen (t, δ0.88 ppm). Once more, no iodo chain ends are present.

Semi- and Perfluorinated Iodides:

$HCF_2$—$CF_2$—$CH_2$—I: The initiator resonance, b', H—$CF_2$—$CF_2$—$CH_2$—PVDF seen at δ6.3 ppm overlaps with the resonance, d, (PVDF—$CH_2$—$CF_2$—H) corresponding to the termination by H abstraction. Thus, while this triplet may suggest higher termination, it is in fact an initiator fragment. Conversely, the methylene initiator resonance H—$CF_2$—$CF_2$—$CH_2$—$CH_2$—$CF_2$—PVDF, overlaps with the HH PVDF a' unit at δ2.35 ppm. H—$CF_2$—$CF_2$—$CH_2$—I is the least active iodine initiator in the series for which iodine chain ends are detected. Thus, resonance, c', i.e., —$CF_2$—$CH_2$—I is observed at δ3.87 ppm (t, $^3J_{HF}$18.2 Hz). As $HCF_2$—$CF_2$—$CH_2$—I represents a model for the less reactive PVDF—$CF_2$—$CH_2$—I chain end, polymer formation here, in conjunction with chain end activation experiments (FIG. 10) demonstrate activation for block synthesis that Mn(CO)$_5$• activates not only —$CH_2$—$CF_2$—I, but also the less reactive —$CF_2$—$CH_2$—I PVDF termini, thus supporting complete chain end activation for block copolymerization.

$(CF_3)_3$C—I: The $(CF_3)_3$C—$CH_2$—$CF_2$— is observed at δ3.24 (t, $^3J_{HF}$17.1 Hz) while the less reactive c' i.e. —$CF_2$—$CH_2$—I is observed at δ3.88 ppm. The more reactive —$CH_2$—$CF_2$—I chain end is seen at c, δ3.62 ppm, q, $^3J_{HF}$16 Hz).

EtOOC—$CF_2$—I: Similarly to its Br counterpart above, the b' resonances ($CH_3$—$CH_2$—O— and are $CH_3$—$CH_2$—O— are seen at δ1.33 ppm (t, $^3J_{HH}$7.15 Hz) and δ4.36 ppm (q, $^3J_{HH}$7.09 Hz), whereas the initiator connectivity b resonance EtOOC—$CF_2$—$CH_2$—$CF_2$— is observed at δ3.10 ppm (m, $^3J_{HF}$15.6 Hz). Both c and c' resonances are again present.

$C_6F_5$—$CF_2$—I: The PVDF first unit b $C_6F_5$—$CF_2$—$CH_2$—$CF_2$ is seen as a multiplet at δ3.30 ppm and the resonances c and c' —$CH_2$—$CF_2$—I and —$CF_2$—$CH_2$—I are observed at δ3.62 ppm (q, $^3J_{HF}$16 Hz) and δ3.87 ppm (t, $^3J_{HF}$18.2 Hz), as above.

$(CF_3)_2$CF—I: The first VDF unit $(CF_3)_2$CF—$CH_2$—$CF_2$—, b, is seen at δ3.23 ppm (quartet, $^3J_{HF}$17.5 Hz) with the resonances c and c', as above.

$CF_3$—I: The typically regiospecific $CF_3$—$CH_2$—$CF_2$ addition is evidenced at □δ3.24 ppm, (tq, $^3J_{HF}$10.3 Hz, $^3J_{HF}$5.2 Hz), as already observed for $CF_3$—$SO_2$—Cl. In addition, both —$CF_2$—$CH_2$—I and —$CH_2$—$CF_2$—I iodine chain ends units c and c' are clearly seen.

$CF_3$—$CF_2$—I: The first VDF unit b $CF_3$—$CF_2$—$CH_2$—$CF_2$—PVDF is seen at □δ3.20 ppm, (quintet, $^3J_{HF}$17.1 Hz) while both iodine chain ends c and c' are again observed.

$CF_3$—$(CF_2)_2$—$CF_2$—I (PFBI): The first VDF unit b, $CF_3$—$(CF_2)_4$—$CF_2$—$CH_2$—$CF_2$ is present at δ3.24 ppm, (quintet $^3J_{HF}$17.1 Hz) as are both c and c' iodo resonances.

Cl—$CF_2$—$(CF_2)_4$—$CF_2$—I: Similarly, the b connectivity is seen at □δ3.23 ppm, and so are the iodo c and c' resonances. However, the Cl chain ends are absent, indicating that no CT is available towards ~$CF_2$—Cl.

Cl—$CF_2$—CFCl—I: This initiator bears a strong resemblance to Cl—$CF_2$—CFCl—Cl and, thus, the connectivity peaks, b, —CFCl—$CF_2$—$CH_2$—$CF_2$— and —$CF_2$—CFCl—$CH_2$—$CF_2$— are also observed as multiplets at δ3.22 ppm and δ3.39 ppm. Interestingly, although the Cl—$CF_2$— bond is likely stronger than the —FClC—I, this initiator still provides difunctional growth. However, only the I-derived chain ends are present while the Cl chain ends are not detected.

I—$(CF_2)_4$—I and I—$(CF_2)_6$—I: These structures are difunctional initiators with equal reactivity end groups. The connectivity is demonstrated by the —$CF_2$—$CH_2$—$(CF_2)_4$—$CH_2$—$CF_2$— and —$CF_2$—$CH_2$—$(CF_2)_6$—$CH_2$—$CF_2$— b at δ3.16 ppm (quintet, $^3J_{HF}$16.5 Hz) and at δ3.22 ppm, (quintet, $^3J_{HF}$17.1 Hz). In both cases, excellent iodine chain ends are seen in conjunction with greatly diminished termination and HH addition similarly to all good perfluoro iodine initiators.

$^{19}$F-NMR Characterization of I—PVDF—I, PVDF—I and PVDF—H

A comparison of $^1$H- and $^{19}$F-NMR proton decoupled spectra of I—PVDF—I initiated from I—(CF$_2$)$_6$—I is provided in Figure S2c, while a comparison of the $^{19}$F-NMR spectra of PVDF—I initiated from CF$_3$—CF$_2$—CF$_2$—CF$_2$—I with the corresponding PVDF—H (obtained by reacting PVDF—I with excess Mn$_2$(CO)$_{10}$ and corresponding to the top of FIG. 10 in the block copolymerization discussion) is shown in Figure S2d,e. In all cases, the $^1$H and $^{19}$F spectra are in accordance, and give very similar values for functionality or $M_n^{MNR}$. The $^{19}$F assignments are discussed below.

The main chain PVDF HT —CF$_2$—[CH$_2$—CF$_2$]$_n$—CH$_2$— unit a is observed at δ−91.3 ppm. While the HH units are greatly minimized in VDF-IDT, trace internal HH are seen as a series of 3 resonances —CH$_2$—CF$_2$—CH$_2$—CF$_2$—CF$_2$—CH$_2$—CH$_2$—CF$_2$—CH$_2$—CF$_2$—, —CH$_2$—CF$_2$—CH$_2$—CF$_2$—CF$_2$—CH$_2$—CF$_2$—CH$_2$—CF$_2$— and —CH$_2$—CF$_2$—CH$_2$—CF$_2$—CF$_2$—CH$_2$—CH$_2$—CF$_2$—CH$_2$—CF$_2$—, peaks a', a'$_1$ and a'$_2$ at δ−113.5 ppm, δ−115.9 ppm and respectively, δ−95.1 ppm. Interestingly, penultimate —CH$_2$—CF$_2$—CF$_2$—CH$_2$—CH$_2$—CF$_2$—I and respectively —CH$_2$—CF$_2$—CF$_2$—CH$_2$—CH$_2$—CF$_2$—H HH units can also be distinguished as a'$_3$ and a'$_4$ at δ−115.2 ppm and δ−115.8 ppm.

The connectivity of the R$_F$ initiators with the main chain is demonstrated by the resonance b, PVDF—CF$_2$—CH$_2$—CF$_2$—CF$_2$—CF$_2$—CF$_2$—CF$_2$—CH$_2$—CF$_2$—PVDF and respectively CF$_3$—CF$_2$—CF$_2$—CF$_2$—CH$_2$—CF$_2$—PVDF associated with the first VDF unit.

The R$_F$ initiator resonances are clearly distinguished as PVDF—CF$_2$—CH$_2$—CF$_2$—CF$_2$—CF$_2$—CF$_2$—CF$_2$—CF$_2$—CH$_2$—CF$_2$—PVDF, PVDF—CF$_2$—CH$_2$—CF$_2$—CF$_2$—CF$_2$—CF$_2$—CF$_2$—CH$_2$—CF$_2$—PVDF and PVDF—CF$_2$—CH$_2$—CF$_2$—CF$_2$—CF$_2$—CF$_2$—CF$_2$—CF$_2$—CH$_2$—CF$_2$—PVDF peaks b$_1$, b$_2$ and b$_3$ at δ−111.7 ppm, δ−121.2 ppm and δ−123.1 ppm for I—PVDF—I and respectively as CF$_3$—CF$_2$—CF$_2$—CF$_2$—CH$_2$—CF$_2$—PVDF, CF$_3$—CF$_2$—CF$_2$—CF$_2$—CH$_2$—CF$_2$—PVDF, CF$_3$—CF$_2$—CF$_2$—CF$_2$—CH$_2$—CF$_2$—PVDF and CF$_3$—CF$_2$—CF$_2$—CF$_2$—CH$_2$—CF$_2$—PVDF peaks b$_4$, b$_5$, b$_6$ and b$_7$ at δ−80.9 ppm δ−125.5 ppm, δ−123.9 ppm and δ−111.9 ppm for PVDF—I and PVDF—H.

The more reactive 1,2-type iodide chain ends are seen as —CH$_2$—CF$_2$—CH$_2$—CF$_2$—CH$_2$—CF$_2$—I and —CH$_2$—CF$_2$—CH$_2$—CF$_2$—CH$_2$—CF$_2$—I, peaks c and c$_1$ at δ−38.5 ppm and respectively δ−92.5 ppm, as well as a weaker, penultimate —CH$_2$—CF$_2$—CF$_2$—CH$_2$—CH$_2$—CF$_2$—I HH unit, c$_2$ at δ−39.3 ppm. The less reactive 2,1-type iodide chain ends are observed as —CH$_2$—CF$_2$—CF$_2$—CH$_2$—I and —CH$_2$—CF$_2$—CF$_2$—CH$_2$—I peaks c' and c'$_1$ at δ−108.3 ppm and respectively δ−112.0 ppm.

Finally, the complete activation of both iodine chain ends by manganese and their replacement with H, enables the clear confirmation of all "c" peaks associated with iodine, via their disappearance, as well as that of the —CH$_2$—CF$_2$—CH$_2$—CF$_2$—H, —CH$_2$—CF$_2$—CF$_2$—CH$_2$—CH$_2$—CF$_2$—H, —CH$_2$—CF$_2$—CF$_2$—CH$_3$ and —CH$_2$—CF$_2$—CF$_2$—CH$_3$H chain ends, peaks d, d$_2$, d' and d'$_1$ at δ−114.7 ppm, δ−116.8 ppm, δ−108.2 ppm and respectively δ−114.1 ppm via their comparative increase in intensity in PVDF—H.

While the disclosure has been described with reference to embodiments, it will be understood by those skilled in the art that various changes may be made and equivalents may be substituted for the elements thereof without departing from the scope of the disclosure. In addition, many modifications may be made to adapt the teaching of the disclosure to particular use, application, manufacturing conditions, use conditions, composition, medium, size, and/or materials without departing from the essential scope thereof. Therefore, it is intended that the disclosure not be limited to the particular embodiments and best modes contemplated for carrying out this disclosure as described herein. The accompanying claims are intended to cover such modifications as would fall within the true scope and spirit of the present disclosure. All of the patents and publications referenced herein are intended to be incorporated herein by reference for all of the information contained therein.

What is claimed is:

1. A method for making a polymer comprised of fluorinated monomer, said method comprising adding metal carbonyl to a liquid reaction medium, adding halide initiator to the mixture of metal carbonyl and liquid reaction medium, adding fluorinated monomer to the combination of metal carbonyl and halide initiator, and allowing the polymerization to proceed for a desired time.

2. A method as claimed in claim 1, wherein the metal carbonyl is selected from the group consisting of carbonyls of rhenium, manganese, tungsten, molybdenum, iron, cobalt and combinations of any of the foregoing.

3. A method as claimed in claim 1, wherein the halide initiator is selected from the group consisting of R—X, X—R—X, CH$_2$=CH—CH$_2$—X, NC—CH(R)—X, (CH$_2$—CO)$_2$N—X, Ar—X, C$_6$H$_5$—CH(CH$_3$)—X, C$_6$H$_4$(CH$_2$—X)$_2$, C$_6$F$_5$—CF$_2$—X, (CH$_3$)$_2$C(COOEt)-X, CF$_2$(COOEt)-X, CH$_2$X$_2$, X$_2$CH—CHX$_2$, CHX$_3$, CCl$_3$—X, X$_3$C—CX$_3$, CX$_4$, R—SO$_2$—X, R$_F$—SO$_2$—X, Ar—SO$_2$—X, R$_F$—CO—X, R$_F$—CH$_2$—X, X—CF$_2$—CH$_2$—CF$_2$—X—R$_F$—X, X—R$_F$—CFXY, X—R$_F$—CFX$_2$, X—(R$_F$—CFX)$_n$—X, (CF$_3$)$_2$CF—X, (CF$_3$)$_3$C—X, R(R$_F$—I)$_{n \cdot n \geq 3}$ and combinations of any of the foregoing; wherein X is a halide or pseudohalide, R is a hydrocarbon and R$_F$ is a semi- or perfluorinated fragment/substrate.

4. A method as claimed in claim 1, wherein the polymerization is conducted at a temperature of from about 0° C. to about 150° C., at a pressure of from about ambient atmospheric pressure to about elevated pressure, and under or in the presence of light.

5. A method as claimed in claim 1, wherein the polymerization is conducted in the dark and at a temperature sufficient to effect polymerization at all pressures.

6. A method for the radical activation of both —CH$_2$—CF$_2$—I and the —CF$_2$—CH$_2$—I chain ends of fluorinated polymer, said process comprising adding metal carbonyl to a liquid reaction medium, adding halide initiator to the mixture of metal carbonyl and liquid reaction medium, adding fluorinated monomer to the combination of metal carbonyl and initiator and allowing the polymerization to proceed for the desired time.

7. A method as claimed in claim 6, further comprising adding a polymerizable second monomer to obtain a copolymer.

8. A method as claimed in claim 6, further comprising adding a non-polymerizable alkene having a desired functional end group to obtain a fluorinated polymer having said desired functional end group.

9. A method as claimed in claim 1, wherein the liquid reaction medium comprises a solvent or supercritical CO$_2$.

10. A method as claimed in claim 6, further comprising adding a polymerizable monomer to the fluorinated polymer to obtain a block copolymer.

11. A method as claimed in claim 1, wherein the polymer has a polydispersity index (PDI) of less than about 3.

12. A method as claimed in claim 1, wherein the polymer has a polydispersity index (PDI) of less than about 2.5.

13. A method as claimed in claim 1, wherein the polymer has a polydispersity index (PDI) of less than about 1.5.

14. A method as claimed in claim 1, wherein the polymer has a $M_n$ greater than about 100.

15. A method as claimed in claim 1, wherein the polymer has a $M_n$ greater than about 500.

* * * * *